(12) United States Patent
Akkaraju et al.

(10) Patent No.: US 11,032,264 B2
(45) Date of Patent: *Jun. 8, 2021

(54) BACKEND SERVICE INTEGRATION

(71) Applicant: Screening Room Media, Inc., West Hollywood, CA (US)

(72) Inventors: Prem Akkaraju, Los Angeles, CA (US); Giorgio Vanzini, Los Angeles, CA (US)

(73) Assignee: SCREENING ROOM MEDIA, INC., West Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/660,361

(22) Filed: Oct. 22, 2019

(65) Prior Publication Data
US 2020/0053071 A1 Feb. 13, 2020

Related U.S. Application Data

(63) Continuation-in-part of application No. 15/463,360, filed on Mar. 20, 2017, now Pat. No. 10,476,944.

(51) Int. Cl.
*G06F 15/16* (2006.01)
*H04L 29/06* (2006.01)

(52) U.S. Cl.
CPC ........ *H04L 63/0815* (2013.01); *H04L 63/101* (2013.01); *H04L 65/4084* (2013.01); *H04L 2463/101* (2013.01); *H04L 2463/102* (2013.01)

(58) Field of Classification Search
CPC ....... H04L 67/10; H04L 67/18; H04L 67/306; H04L 67/325; H04L 63/0815;
(Continued)

(56) References Cited

U.S. PATENT DOCUMENTS 7,058,685 B1 * 6/2006 van Zee ............... G06Q 10/107
709/217
8,396,982 B2 * 3/2013 Okada ..................... H04L 67/06
709/232

(Continued)

OTHER PUBLICATIONS

"U.S. Appl. No. 15/463,360, Non Final Office Action dated Jan. 25, 2019", 10 pgs.

(Continued)

*Primary Examiner* — Bharat Barot
(74) *Attorney, Agent, or Firm* — Schwegman Lundberg & Woessner, P.A.

(57) ABSTRACT

A method for providing an integrated service includes assigning a digital credential to a user account; receiving a request to schedule an integrated service in relation to the scheduled presentation of the digital content item; identifying, based on the digital credential assigned to the user account, the scheduled presentation of the digital content item; determining, based on the scheduled presentation of the digital content item, a set of available integrated services; providing, to the computing device, data identifying the set of available integrated services; receiving, from the computing device, a user selection of a first integrated service from the set of available integrated services; generating, based on data associated with the scheduled presentation of the digital content item, a service request to provide the first integrated service; and transmitting, to a remote server that provides the first integrated service, the service request to provide the first integrated service.

20 Claims, 13 Drawing Sheets

(58) Field of Classification Search
CPC ............... H04L 63/101; H04L 65/4084; H04L 2463/101; H04L 2463/102
USPC ................................ 709/202–203, 217–219
See application file for complete search history.

(56) References Cited

U.S. PATENT DOCUMENTS

| | | | |
|---|---|---|---|
| 9,402,093 | B2 | 7/2016 | Lieu et al. |
| 10,476,944 | B2 * | 11/2019 | Akkaraju ................. H04L 67/10 |
| 2003/0005453 | A1 | 1/2003 | Rodriguez et al. |
| 2007/0050834 | A1 | 3/2007 | Royo et al. |
| 2010/0179895 | A1 * | 7/2010 | Chou ...................... G06Q 10/06 705/34 |
| 2010/0205023 | A1 * | 8/2010 | Wagner .................. G06Q 30/06 709/203 |
| 2011/0239282 | A1 | 9/2011 | Svarfvar et al. |
| 2013/0080578 | A1 | 3/2013 | Murad et al. |
| 2014/0310779 | A1 | 10/2014 | Lof et al. |
| 2015/0039505 | A1 * | 2/2015 | Jin ........................ G06Q 20/401 705/44 |
| 2016/0119396 | A1 | 4/2016 | Conley |
| 2017/0177605 | A1 | 6/2017 | Hoffert et al. |
| 2018/0270294 | A1 | 9/2018 | Akkaraju et al. |
| 2019/0065514 | A1 | 2/2019 | Siddiquee et al. |

OTHER PUBLICATIONS

"U.S. Appl. No. 15/463,360, Response filed Apr. 25, 2019 to Non Final Office Action dated Jan. 25, 2019", 14 pgs.
"U.S. Appl. No. 15/463,360, Notice of Allowance dated Jul. 3, 2019", 10 pgs.

* cited by examiner

BACKEND SERVICE INTEGRATION

CROSS-REFERENCE TO RELATED APPLICATIONS

This application is a continuation in part of U.S. patent application Ser. No. 15/463,360, filed on Mar. 20, 2018, which is incorporated herein by reference in its entirety.

BACKGROUND

With the advent of digital data and the Internet, digital content can now be shared quickly and easily to users in almost any geographic location. For example, digital content posted publicly to websites can be accessed by any user with a computer and Internet connection. Although sharing digital content, particularly digital content that is intended to be accessed with no restrictions, has become much easier, the threat of unauthorized access and/or use of digital content that is intended to be restricted has increased. For example, some digital content can be intended to be accessed and/or used under specified restricted conditions, such as confidential content, sensitive content, licensed content, etc.

Current systems focus their security efforts on restricting initial access to digital content, and provide little to no security once initial access has been granted. For example, many systems will require initial user authentication (e.g., user name, password, device recognition, etc.,) prior to providing access to digital content, but do not monitor use of the digital content after initial access is granted. As a result, digital content can easily be misused, copied, shared, etc. Accordingly, improvements are needed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
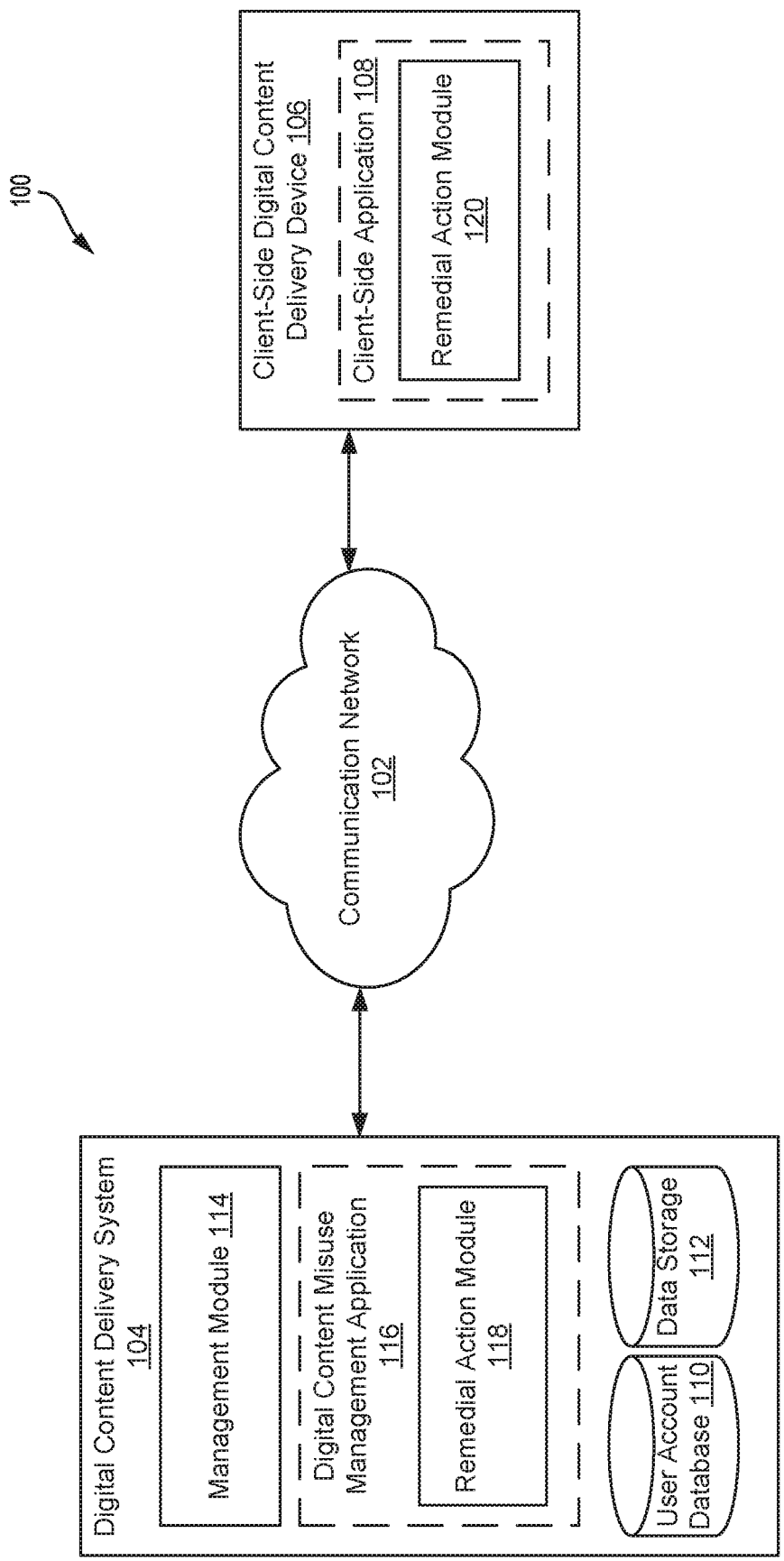
FIG. 1 is a schematic diagram showing an example digital content distribution network, according to certain example embodiments.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT-SIDE DIGITAL CONTENT DELIVERY DEVICE" in this context refers to any machine that interfaces to a communication network to obtain resources from one or more server systems or other computing device. A client-side digital content delivery device may be, but is not limited to, a mobile phone, desktop computer, laptop, portable digital assistants (PDAs), smart phones, tablets, ultrabooks, netbooks, laptops, multi-processor systems, microprocessor-based or programmable consumer electronics, game consoles, set-top boxes, or any other communication device that a user may use to access a network.

"COMMUNICATION NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"DIGITAL CONTENT DELIVERY SYSTEM OR DIGITAL CONTENT DISTRIBUTION NETWORK" in this context refers to a system of distributed servers (e.g. networked proxy server) that deliver digital content to a user.

"MACHINE-READABLE MEDIUM" in this context refers to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"MODULE" in this context refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner.

In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any, suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC).

A hardware module may also include programmable logic or circuitry, that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) r permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may, also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program interface (API)). The performance of certain of the operations may be distributed among the processors, not only, residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RTIC) or any combination thereof. A processor may further be a multi-core processor having two or more independent processors (sometimes referred to as "cores") that may execute instructions contemporaneously.

Description

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SCREENING ROOM MEDIA, INC., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Drawings

The current application discloses a number of technologies that may be used, in example embodiments, to address and mitigate challenges with enforcing access and/or usage restrictions on digital content. These technologies monitor use of digital content and suspend or terminate access to digital content when certain behaviors are detected.

FIG. 1 is a schematic diagram showing an example digital content distribution network, according to certain example embodiments. It shall be appreciated that although the various functional components of network 100 are discussed in a singular sense, multiple instances of one or more of the various functional components may be employed.

Network 100 includes multiple computing devices connected to communication network 102 and configured to communicate with each other through use of communication network 102. A computing device can be any type of general computing device capable of network communication with other computing devices. For example, a computing device can be a personal computing device such as a desktop or workstation, a business server, or a portable computing device, such as a laptop, smart phone, or a tablet PC. A computing device includes some or all of the features, components, and peripherals of machine 900 of FIG. 9.

To facilitate communication with other computing devices, a computing device includes a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

Network 100 includes digital content delivery system 104 and client-side digital content delivery device 106 that are configured to provide digital content to users, as well as to enforce access and/or usage restrictions on the digital content. Digital content includes any type of digital content or data, such as text files, video files, music files, etc. Digital content can be associated with one or more intended restrictions on access and/or use of the digital content. For example, digital content includes confidential data and/or sensitive data, such as personal information (e.g., social security number), financial information (e.g., bank records, account numbers, etc.), medical records, confidential work materials, etc., that are restricted for use by specified people. Digital content can also include licensed content, such as movie rentals, movie purchases, music rentals, etc., that can be restricted for use by a specified person or audience, during specified times, etc.

Restrictions includes any type of restriction regarding accessing and/or using the digital content, such as a specified user or specified set of users that can access and/or use the digital content, a specified time period during which the digital content can be accessed and/or used, a specified geographic location where the digital content can be accessed and/or used, restrictions on how the digital content can be accessed and/or used, restrictions on whether the digital content can be copied and/or shared, etc.

In network 100, digital content delivery system 104 and client-side digital content delivery device 106 work together to provide users with access to digital content, as well as to enforce access and/or usage restrictions on the digital content. For example, digital content delivery system 104 and client-side digital content delivery device 106 monitor one or more usage signals to ensure that digital content is not being misused (e.g., that restrictions associated with the digital content are not being violated). In the event that digital content is being misused, or is potentially being misused, digital content delivery system 104 and/or client-side digital content delivery device 106 execute one or more remedial actions, such as suspend or terminate a user's access to the digital content, gather additional data, investigate use of the digital content, etc.

In network 100, a user interacts with digital content delivery system 104 through client-side digital content delivery device 106 connected to communication network 102 by direct and/or indirect communication. Digital content delivery system 104 includes computing devices configured to work with client-side digital content delivery device 106 to provide users with digital content, as well as to enforce access and/or usage restrictions on the digital content. Digital content delivery system 104 supports connections from a variety of different types of client-side digital content delivery devices 106, such as desktop computers; mobile computers; mobile communications devices (e.g. mobile phones, smart phones, tablets, etc.); smart televisions; set-top boxes; and/or any other network-enabled computing devices. Client-side digital content delivery device 106 can be of varying type, capabilities, operating systems, etc. Furthermore, digital content delivery system 104 can concurrently accept connections from and interact with multiple client-side digital content delivery devices 106.

A user interacts with digital content delivery system 104 via client-side application 108 installed on client-side digital content delivery device 106. In some embodiments, client-side application 108 includes a digital content delivery system-specific component. For example, the component can be a stand-alone application, one or more application plug-ins, and/or a browser extension. Client-side application 108 can present a user interface (UI) for the user to interact with digital content delivery system 104. For example, the UI provides the user with digital content as well as include one or more user interface elements (e.g., buttons, text fields, etc.) to enable a user to interact with digital content delivery system 104.

Additionally, client-side application 108 presents a user with digital content. Client-side application 108 can use output devices (e.g., display, speaker, etc.) of client-side digital content delivery device 106 and/or a secondary computing device (not shown) coupled to client-side digital content delivery device 106 to present digital content received from digital content delivery system 104. For example, where client-side digital content delivery device 106 is a mobile phone, client-side application 108 can cause presentation of digital content using a display and/or speaker of the mobile phone. As another example, where client-side digital content delivery device 106 is a set-top box, client-side application 108 can cause presentation of digital content on a display of a viewing device (e.g., television, monitor, etc.) that is connected to the set-top box.

Client-side application 108 embeds digital content with a digital watermark that can be used if the digital content has been misused. For example, the digital watermark can be embedded with an identifier for client-side digital content delivery device 106. Once embedded in the digital content, the digital watermark is present in any copies made of the digital content, including unauthorized copies. Hence, if an unauthorized copy of digital content is found, the digital watermark embedded in the unauthorized copy can be used to identify the source.

Digital content delivery system 104 can be configured to manage digital content for multiple user accounts. For example, digital content delivery system 104 allows users to store, access, rent and/or purchase digital content.

To facilitate the various services provided by digital content delivery system 104, a user can create a user account with digital content delivery system 104. The account information for each created user account is maintained in user account database 110. User account database 110 stores profile information for each user account, including a unique account identifier identifying the user account, personal information, username, password, email address, home address, credit card information, banking information, etc. User account database 110 also includes account management information, such as data storage locations, security settings, personal configuration settings, device identifier for client-side digital content delivery devices 106 that are authorized to access the user account, etc.

A user account can be used to purchase, rent, manage and store digital content, such as digital data, documents, text files, audio files, video files, etc. For example, digital content delivery system 104 provides an online retailer where users can purchase/rent digital content, such as movies, shows, books, music, etc.

Upon digital content being purchased and/or rented by a user, the user's account is updated to indicate that the user has acquired a license to the purchased and/or rented digital content. This allows the user to access the digital content using client-side digital content delivery devices 106. For example, a digital content identifier identifying rented and/or purchased digital content (e.g., movie) is assigned to a user account in user account database 110 and associated with the corresponding user account. The digital content identifier can be used to identify the digital content as well as the location of the digital content.

Further, the user's account is updated with data defining restrictions associated with the digital content, such users authorized to access or use the digital content, geographic locations where the digital content can be accessed, times during which the digital content can be accessed, etc. The restrictions can be based on a license purchased by the user with respect to digital content. For example, a user may have purchased a limited rental of a movie that entitles the user to view the movie a limited number of times, during a limited time and/or with a limited number of other users.

The user's account may also be updated to allot digital credits to the user as a reward for purchasing and/or renting the digital content. Allotting digital credits to a user account may involve increasing a number of digital credits assigned to the user account based on the purchase and/or rental made by the user. The digital credits allotted to a user account may be used to complete later transactions, such as purchasing digital content, renting digital content, purchasing real world items, purchasing services, etc.

Digital content can be stored in data storage 112. Data storage 112 can be a storage device, multiple storage devices, or a server. Alternatively, data storage 112 can be a cloud storage provider or network storage accessible via one or more communication networks. Digital content delivery system 104 can hide the complexity and details regarding storage of digital content from client-side digital content delivery device 106 such that the location of digital content stored by digital content delivery system 104 is not known by client-side digital content delivery device 106. Digital content delivery system 104 can store the digital content in a network accessible storage (SAN) device, in a redundant array of inexpensive disks (RAID), etc. Data storage 112 can store digital content using one or more partition types, such as FAT, FAT32, NTFS, EXT2, EXT3, EXT4, ZFS, ReiserFS, BTRFS, and so forth.

Data storage 112 can also store metadata describing digital content, digital content types, and the relationship of digital content to various user accounts. The metadata can be stored as part of the digital content or can be stored separately. In one variation, digital content stored in data storage 112 can be assigned a system-wide unique identifier. In some embodiments, the metadata includes restrictions associated with the digital content.

Digital content delivery system 104 includes management module 114 configured to manage and access each user account and the digital content assigned to the user accounts. For example, management module 114 can be configured to communicate with user account database 110 and data storage 112 to adjust privileges and otherwise manage access to digital content.

Upon a user logging into their user account from client-side digital content delivery device 106, management module 114 can access the account information associated with the user account to identify digital content assigned to the user account, as well as any corresponding restrictions placed on the digital content. Management module 114 can enable a user to access and/or use the digital content assigned to the user's account. For example, management module 114 can access the user's account to identify digital content identifiers assigned to the user account. Management module 114 uses the digital content identifiers to identify and locate the digital content assigned to the user's account, which can be presented according to the account configuration data.

Management module 114 can also modify the user's profile to update the user's usage history. Each user's profile includes a usage history indicating the digital content that the user has accessed and/or used, as well as metadata describing each use. This includes the times at which the user accessed and/or used the digital content, as well as any other usage signal data, such as a number of mobile computing devices present during usage, geographic location of the user when accessing the digital content, client-side digital content delivery device 106 used to access the digital content, etc. Management module 114 can access a user's account and update the user's usage history as the user accesses and/or uses digital content to record each use.

As explained above, in network 100, digital content delivery system 104 and client-side digital content delivery device 106 can monitor one or more usage signals to ensure that digital content is not being misused and, in the event that digital content is potentially being misused, execute one or more remedial actions. Usage signals can be any type of data gathered with regard to presenting digital content. For example, usage signals includes the user's usage history, frequency that a user accesses digital content, a number of times the user has accessed a particular item of digital content (e.g., a particular movie, document, etc.), a number of detected users viewing the digital content, location of the user when accessing digital content, configuration changes prior to or while accessing digital content, etc.

Digital content delivery system 104 and client-side digital content delivery device 106 can each gather and share usage signal data to determine whether digital content is potentially being misused and, in the event that digital content is potentially being misused, execute one or more remedial actions. For example, digital content delivery system 104 includes digital content misuse management application 116 that are configured to determine whether digital content is potentially being misused and, in the event that digital content is potentially being misused, execute one or more remedial actions. Likewise, client-side application 108 can be configured to determine whether digital content is potentially being misused and, in the event that digital content is potentially being misused, execute one or more remedial actions.

A remedial action can be one or more actions performed with the intent of stopping misuse of digital content. For example, a remedial action includes terminating performance of digital content, suspending performance of digital content, disabling client-side digital content delivery device 106, gathering additional data to determine whether a suspected misuse of digital content is in fact a misuse of the content, etc.

A remedial action can be performed by digital content delivery system 104 and/or client-side digital content delivery device 106. As shown, digital content delivery system 104 includes remedial action module 118 configure to execute remedial actions. Likewise, client-side digital content delivery device 106 includes remedial action module 120 configured to execute remedial actions.

A remedial action includes terminating performance of digital content, which can cause the performance of digital content being performed by client-side digital content delivery device 106 to end. For example, remedial action module 118 can cause digital content delivery system 104 to stop transmitting (e.g., streaming, downloading, etc.) the digital content to client-side digital content delivery device 106, thereby terminating performance of the digital content. As another example, remedial action module 118 can transmit a command to client-side digital content delivery device 106 to stop performing the digital content. As another example, remedial action module 120 can cause client-side digital content delivery device 106 to terminate performance of the digital content.

A remedial action includes causing client-side digital content delivery, device 106 to suspend performance of digital content. In contrast to terminating performance of digital content, suspending performance includes pausing performance of the digital content. This can be for a specified period of time or until a command is received to resume performance. For example, digital content delivery system 104 can transmit a command to client-side digital content delivery device 106 to resume performance of the suspended digital content. This can be the result of digital content delivery system 104 determining that the digital content is not being misused.

A remedial action includes disabling client-side digital content delivery device 106. Disabling client-side digital content delivery device 106 can cause client-side digital content delivery device 106 to be inoperable to perform any function by the user.

A remedial action includes gathering additional information to determine whether a suspected misuse of digital content is in fact a misuse. Remedial action module 118 and/or remedial action module 120 can cause social media activity of one or more users associated with client-side digital content delivery device 106 to be scanned to gather information indicating that the user(s) are misusing digital content. For example, remedial action module 118 and/or remedial action module 120 can scan a user's social media activity for postings indicating that the user allowed unauthorized access to digital content (e.g., hosting viewing of movies for large audiences).

A remedial action includes simply presenting a user with a warning or message indicating that the user is suspected of misusing digital content. Although several examples of remedial actions are given, these are just some examples and are not meant to be limiting.

Figure 2:
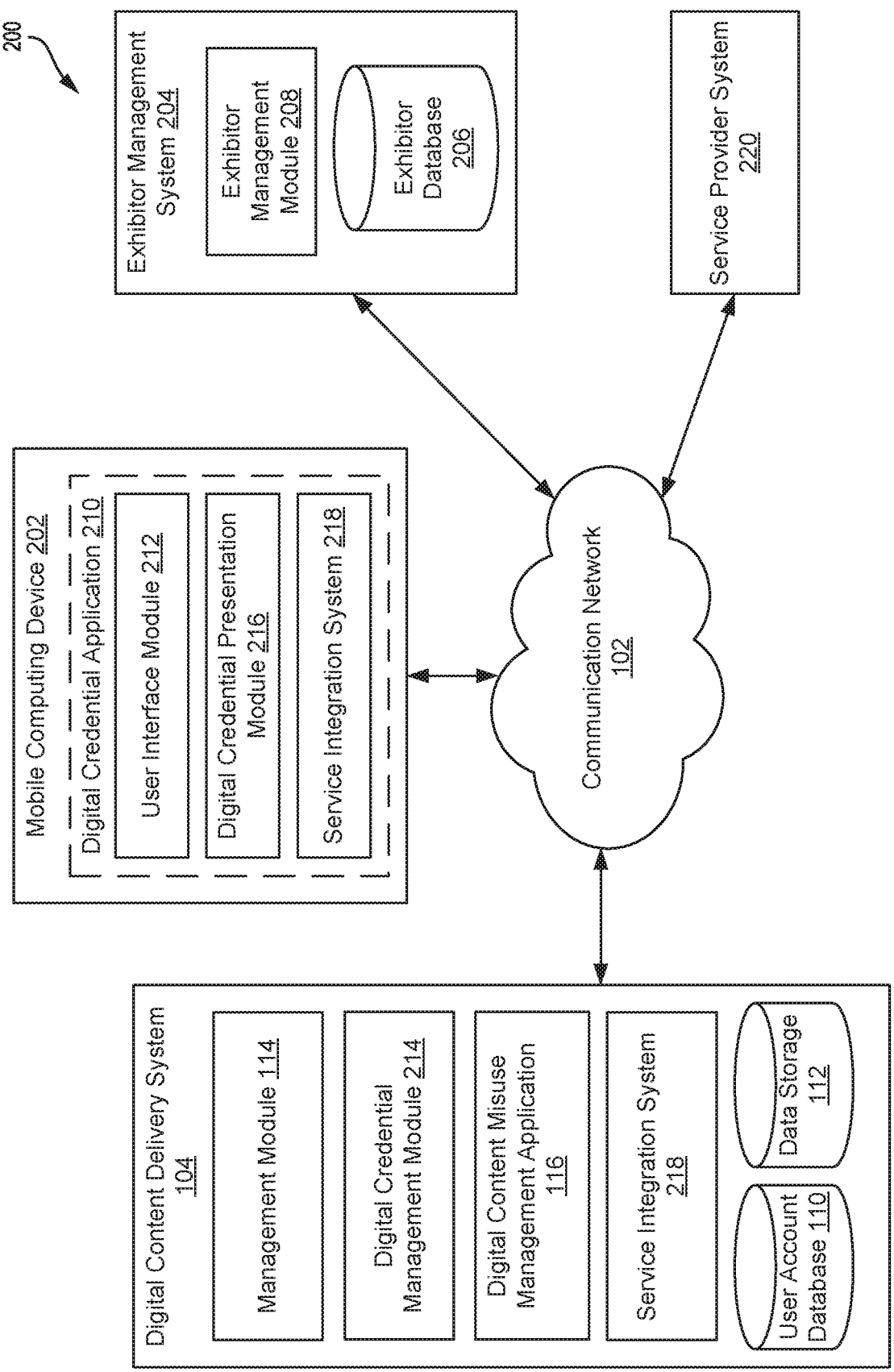
FIG. 2 is a schematic diagram showing an example system configured to issue digital credentials, according to certain example embodiments.

FIG. 2 is a schematic diagram showing an example system 200 configured to issue digital credentials, according to certain example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported to facilitate additional functionality that is not specifically described herein. Furthermore, the various functional modules depicted in FIG. 2 may reside on a single computing device or may be distributed across several computing devices in various arrangements such as those used in cloud-based architectures.

Digital content delivery system 104 issues digital credentials that are redeemable by a user. For example, a digital credential can be redeemed to provide a user with access to an exhibitor location, such as a movie theatre, to view a scheduled presentation of a digital content item (e.g., a scheduled movie).

A digital content license acquired by a user allows the user to access the digital content item using client-side digital content delivery device 106 and/or attend a scheduled presentation of the digital content item at an exhibitor location. As an example, a user that purchases a movie rental that can be streamed to the user's client-side digital content delivery device 106 can also be allotted two tickets (i.e., digital credentials) to view the movie at a movie theatre until the movie is no longer available. As another example, the user may be allocated digital credits that are redeemable by the user to purchase tickets to view the movie at a theatre. A user can therefore choose to view the movie rental at home and/or view the movie at a movie theater.

Digital content delivery system 104 provides users with one or more integrated services with relation to a scheduled presentation of a digital content item. An integrated service is any service provided by a service provider, such as a third-party service provided by a service provider (e.g., that may not be affiliated with digital content delivery system 104), as well as any service and/or amenity provided by an exhibitor, exhibitor location, etc., that is affiliated with digital content delivery system 104. Examples of an integrated service include ordering refreshments at an exhibitor location, reserving seats for a scheduled presentation of a digital content item, scheduling for transportation to and/or from an exhibitor location, purchasing items associated with the digital content item (e.g., t-shirts, posters, etc.), posting to a social networking site, messaging friends about the scheduled presentation of the digital content item, etc.

Digital content delivery system 104 gathers data to provide a user with an integrated service. For example, digital content delivery system 104 can gather profile data describing the user, such as the user's name, address, account information (e.g., user name and password) to access a third-party service, etc. The profile data can further include digital content licenses and/or digital credentials assigned to the user's account, as well as associated metadata. For example, the associated metadata may include data describing the day and time of a scheduled presentation of a digital content item, as well as the address of a selected exhibitor location. Digital content delivery system 104 also gathers contextual data, such as the user's current location.

Digital content delivery system 104 uses the gathered data to provide the user with an integrated service. For example, digital content delivery system 104 can use a user's current location, the address of the selected exhibitor location and a start time to schedule transportation to and/or from the scheduled presentation of the digital content item. As another example, digital content delivery system 104 can use the time and location of the scheduled presentation to generate a social networking post to be displayed on a social networking site. For example, the generated social networking post can indicate that the user is attending the scheduled presentation of the digital content item.

In FIG. 2, digital content delivery system 104, mobile computing device 202, exhibitor management system 204 and service provider system 220 communicate with each other via communication network 102 to reserve and issue digital credentials that are redeemable by a user to access a scheduled presentation of a digital content item at an exhibitor location, as well as provide one or more integrated services with relation to a scheduled presentation of a digital content item.

Exhibitor management system 204 can be a computing system comprising computing devices associated with an exhibitor. An exhibitor can be an organization, business, etc., that provides scheduled presentations of digital content at one or more exhibitor locations. For example, an exhibitor can be a movie theatre chain that provides scheduled showings of movies at one or more movie theaters.

Exhibitor management system 204 includes exhibitor database 206 that maintains exhibitor data describing scheduled presentations of digital content items provided by the exhibitor. Exhibitor data includes data identifying the exhibitor locations associated with the exhibitor (e.g., movie theatres), the digital content items scheduled for presentation at each exhibitor location (e.g., movies) and/or scheduled presentations at each exhibitor location (e.g., scheduled show times). Exhibitor data also includes data identifying digital credential availability for each scheduled presentation (e.g., number of unsold digital credentials available for purchase), seating charts for each exhibitor location, seating availability (e.g., unreserved seats), amenities provided by each exhibitor location, the address of each exhibitor location, etc. Exhibitor data also includes content associated with the exhibitor, exhibitor locations, and/or digital content items. For example, exhibitor data includes content such as written movie descriptions, movie trailers, movie reviews, movie theatre reviews, actors in a movie, movie directors, digital content item release dates, terms of use, etc.

Exhibitor management system 204 includes exhibitor management module 208 configured to reserve digital credentials and amenities for scheduled presentations of digital content items. Exhibitor management module 208 communicates with exhibitor database 206 to gather requested exhibitor data, provide requested exhibitor data to requesting computing devices and/or update exhibitor data to reflect a reservation of a digital credential and/or amenity. For example, exhibitor management module 208 processes read requests for exhibitor data such as show times for a specified movie, theatres within a predetermined geographic area that are presenting a specified movie, digital credential and/or seating availability for one or more scheduled presentations, available amenities at an exhibitor location, movie trailers, movie reviews, etc. in response to receiving a read request for exhibitor data, exhibitor management module 208 gathers the requested exhibitor data from exhibitor database 206 and returns the requested exhibitor data in response to the read request.

Exhibitor management module 208 also processes reservation requests. A reservation request is a request to reserve digital credentials and/or amenities for a scheduled presentation of a digital content item. In response to receiving a reservation request, exhibitor management module 208 initially confirms whether the reservation request can be fulfilled. For example, exhibitor management module 208 determines whether there are a sufficient number of available digital credentials to fulfill the reservation request. As another example, exhibitor management module 208 determines whether selected seats are available to be reserved. If exhibitor management module 208 determines that the reservation request can be fulfilled, exhibitor management module 208 updates exhibitor database 206 to fulfill the request. For example, exhibitor management module 208 updates exhibitor database 206 to indicate that requested digital credentials have been reserved, update the number of reserved digital credentials for the scheduled presentation, update a seating chart to reflect that specific seats have been reserved, etc.

Exhibitor management module 208 also generates and provides reservation data reflecting that a requested reservation has been completed. Reservation data includes data indicating that the reservation request has been completed as well as data that to redeem or confirm the reservation at an exhibitor location. For example, reservation data includes a unique code associated with reserved digital credentials, reserved seats, reserved amenities, etc., that are used by an exhibitor to confirm the reservation. Reservation data also includes data describing the reservation, such as reserved seats, selected exhibitor location, selected scheduled presentation, reserved amenities (e.g., purchased food items), purchasing user, etc. The reservation data is provided to a user for use at the exhibitor and/or provided directly to the exhibitor location.

Exhibitor management module 208 may also update the digital credits allocated to a user profile based on each the completed reservation. For example, exhibitor management module 208 may deduct a number of digital credits allocated to the user's profile based on a number of digital credits needed to reserve digital credentials and/or amenities for a scheduled presentation of a digital content item.

In system 200, a user uses mobile computing device 202 to reserve a digital credential for a scheduled presentation of a digital content item, as well as reserve amenities. As shown, mobile computing device 202 includes digital credential application 210. Digital credential application 210 enables a user to communicate with digital content delivery system 104 to request exhibitor data as well as to reserve digital credentials and/or amenities. Digital credential application 210 includes user interface module 212 configured to present a user with an exhibitor interface including user interface elements (e.g., buttons, text fields, etc.) that enable a user to request and select data. For example, the exhibitor interface provides a user with a listing of scheduled presentations for a digital content item and allows the user to reserve digital credentials to one or more of the listed scheduled presentations. The listing may include data indicating a monetary value associated with reserving digital credential to the listed scheduled presentations and/or a number of digital credits needed to reserve the digital credential to the listed scheduled presentations. As another example, the exhibitor interface provides a user with a listing of unreserved seats for a scheduled presentation and allows the user to reserve one or more of the unreserved seats. As another example, the exhibitor interface enables the user to enter and/or select one or more exhibitor data parameters (e.g., desired movie, desired theatre, desired day/time) and then provides the user with exhibitor data based on the exhibitor data parameters entered and/or selected by the user.

Digital credential application 210 communicates with digital content delivery system 104 to perform one or more actions requested by the user, such as requests to read exhibitor data, requests to reserve digital credentials and/or amenities, etc. For example, digital credential application 210 transmits requests to digital content delivery system 104 to perform specified actions, such as requests to read exhibitor data, requests to reserve digital credentials and/or amenities, etc. Digital credential application 210 includes data in the requests that enables digital content delivery system 104 to complete the request. For example, the request includes one or more exhibitor data parameters selected by the user.

Digital content delivery system 104 includes digital credential management module 214 configured to receive and respond to requests from mobile computing device 202. For example, digital content delivery system 104 receives a request from mobile computing device 202 for specified exhibitor data and, in response, transmits a read request to exhibitor management system 204 for the specified exhibitor data. Digital content delivery system 104 provides the returned exhibitor data to mobile computing device 202, where it is presented to a user in an exhibitor interface.

As another example, digital credential management module 214 receives a request from mobile computing device 202 to reserve a digital credential to a scheduled presentation and/or reserve one or more amenities. In response, digital credential management module 214 transmits a reservation request to exhibitor management system 204 to reserve the digital credential and/or amenities.

Digital credential management module 214 receives reservation data from exhibitor management system 204 confirming that the requested reservation has been completed. In response, digital credential management module 214 updates the requesting user's account in user account database 110 to reflect that the user's requested reservation has been completed and that the requested digital credential and/or amenities are assigned to the requesting user's account. For example, digital credential management module 214 updates the requesting user's account with metadata describing the digital credentials assigned to the user's accounts, such as metadata describing a selected exhibitor location, selected scheduled presentation, selected seats, purchased amenities, etc. Digital credential management module 214 also stores any unique codes received from exhibitor management system 204 that enable a user to redeem the digital credentials assigned to the user's account and/or any reserved amenities.

Digital credential management module 214 may also update the number of digital credits allocated to the user account. For example, digital credential management module 214 may allocate additional digital credits to the user account by increasing the number of digital credits allocated to the user account. As another example, digital credential management module 214 may reduce the number of digital credits allocated to the user account to reflect a reservation made using the digital credits. For example, digital credential management module 214 may reduce the number of digital credits allocated to the user account based on the number of digital credits needed to reserve the digital credential to the listed scheduled presentations and/or a number of digital credits needed to reserve the digital credential to the listed scheduled presentations.

Digital credential management module 214 provides a user with exhibitor data and/or reserves a digital credential for the user based on a digital content license assigned to the user's account. For example, a digital content license allows the user to access the digital content item using client-side digital content delivery device 106 and/or attend a scheduled presentation of the digital content item at an exhibitor location. In this type of scenario, a user that purchases a movie rental to be streamed to the user's client-side digital content delivery device 106 is also be allotted two digital credentials to view the movie at a movie theatre. A user is therefore allowed to choose to view the movie rental at home and/or view the movie at a movie theater.

A digital content license purchased and/or otherwise acquired by a user may be associated with a particular exhibitor. For example, the digital content license is associated with an exhibitor that operates within a geographic region where the user resides. As another example, the digital content license is associated with an exhibitor selected by the user as the user's preferred exhibitor. In some instances, the exhibitor receives a portion of the revenue associated with the user's purchase of the digital content license to access the digital content item.

In this type of scenario, digital credential management module 214 presents the user with exhibitor data, reserves a digital credential, and/or allocated digital credits based on the digital content license purchased by the user and assigned to the user's account. This includes allocating digital credits to the user's account that enable the user to reserve a digital credential for a scheduled presentation of the digital content item associated with the digital content license, a scheduled presentation offered at an exhibitor location associated with the digital content license and/or a scheduled presentation of an alternate digital content item. For example, digital credential management module 214 accesses the user's account in user account database 110 to identify a digital content license assigned to the user's account. Based on the digital content license, digital credential management module 214 determines a digital content item that the user has purchased a digital content license to access, alternate digital content items that the user can select, and/or an exhibitor or set of exhibitors associated with the digital content item. Digital credential management module 214 uses the determined digital content item and exhibitor to transmit a read request to exhibitor management system 204 for exhibitor data describing scheduled performances of the digital content item and/or alternate digital content items at exhibitor locations associated with the exhibitor. The returned exhibitor data identifies exhibitor locations and scheduled performances that the user is licensed to attend according to the digital content license assigned to the user's account. The user is enabled to reserve digital credentials to any one of the scheduled performances presented to the user. For example, the digital credits allocated to the user's account are redeemable to reserve credentials to any one of the scheduled performances presented to the user.

In some situations, an exhibitor manages a large number of exhibitor locations, and thus providing the user with exhibitor data for all exhibitor locations is excessive and/or unnecessary. In this type of situation, digital credential management module 214 provides the user with a subset of exhibitor data based on the location of the user in relation to exhibitor locations managed by the exhibitor. For example, digital credential management module 214 selects a subset of exhibitor locations that are within a predetermined geographic distance of a known dwelling of the user or, alternatively, a determined current location of the user. Digital credential management module 214 then provides the user with exhibitor data for the subset of exhibitor locations.

Once a digital credential has been reserved and assigned to a user's account, the user uses mobile computing device 202 to retrieve the digital credential. For example, the user uses the exhibitor interface to request that digital credentials assigned to the user's account be transmitted to mobile computing device 202. Digital credential application 210 includes digital credential presentation module 216 configured to receive a digital credential from digital content delivery system 104 and render a visual representation of the digital credential. Once rendered, the digital credential can be redeemed by a user to grant the user access to a selected scheduled presentation of the digital content item.

Digital content delivery system 104 uses one or more security measures to prevent misuse of digital credentials, such as digital credentials being issued to an incorrect user and/or the digital credential being used in violation of the terms of a digital license (e.g., the digital credential being redeemed by an incorrect user and/or the digital credential being resold).

Digital content misuse management application 116 prevents misuse of digital credentials by restricting a user's access to digital credentials assigned to the user's account until one or more conditions are satisfied. One such condition is based on the location of the user in relation to an exhibitor location. For example, digital content misuse management application 116 requires that the user be located within a predetermined geographic distance of the exhibitor location at which the digital credential can be redeemed. Hence a user cannot access the digital credential until the user is nearby the exhibitor location.

In response to receiving a request to access a digital credential at mobile computing device 202, digital content misuse management application 116 determines whether a current location of mobile computing device 202 is within a predetermined geographic distance of the exhibitor location where the digital credential can be redeemed. Digital content misuse management application 116 accesses the user's account to gather metadata describing the geographic location of the exhibitor location. Digital content misuse management application 116 retrieves the current location of mobile computing device 202 from mobile computing device 202 (e.g., as part of a request received from mobile computing device 202 or in response to a separate request). Digital content misuse management application 116 uses the current location of mobile computing device 202 and the geographic location of the exhibitor location to determine whether the current location of mobile computing device 202 is within the predetermined geographic distance of the exhibitor location.

Another condition is based on the current time in relation to a start time of the scheduled presentation. For example, digital content misuse management application 116 requires that a remaining amount of time until a start time of the scheduled presentation be less than a threshold amount of time, Hence a user cannot access the digital credential until a short time before the start of the scheduled presentation. Digital content misuse management application 116 accesses the user's account to gather metadata describing the scheduled start time of the scheduled presentation and determines whether a remaining amount of time until the scheduled start time (e.g., a time duration between the current time and the scheduled start time) is less than the threshold amount of time.

Another condition is based on the requesting mobile computing device. For example, digital content misuse management application 116 restricts access to the digital credential to one or more mobile computing devices authorized with the user's account. Device identifiers for the authorized mobile computing device(s) are stored in the user's account. Digital content misuse management application 116 requests a device identifier from mobile computing device 202 that requested the digital credentials and then accesses the user's account to determine whether the device identifier received from mobile computing device 202 is included in the list of authorized device identifiers.

Digital content misuse management application 116 denies a request to issue a digital credential if one or more of the described conditions are not satisfied. For example, digital content misuse management application 116 requires that all conditions be satisfied for the request to be approved (e.g., the user be located nearby the theatre, the movie to start shortly and the requesting mobile computing device be authorized on the user's account). Alternatively, in some embodiments, digital content misuse management application 116 requires that at least one or two of the conditions be satisfied for the request to be approved.

If digital content misuse management application 116 determines that a sufficient number of conditions have been satisfied, digital content misuse management application 116 transmits the digital credential to mobile computing device 202. This includes gathering and providing reservation data associated with the digital credential to mobile computing device 202. For example, digital content misuse management application 116 accesses the user's account to access the reservation data associated with the digital credential.

Once the reservation data is received by mobile computing device 202, digital credential presentation module 216 uses the reservation data to render a graphical representation of the digital credential, such as scannable code (e.g., Quick Response (QR) code, bar code, number code etc,). The scannable code is embedded with reservation data that can be used to confirm the user's reservation. For example, the scannable code is embedded with the unique code associated with the reservation of the digital credentials, the number of digital credentials purchased, reserved seats, purchaser name, etc. The scannable code is scanned at an exhibitor location using a scanning device capable of reading the scannable code to retrieve the reservation data embedded in the scannable code. Alternatively, the scannable code include a readable code (e.g., combination of number, letters, symbols, etc.) that an employee reads and/or manually enter into a computing device to retrieve the reservation data.

In some embodiments, digital content misuse management application 116 causes presentation of an obfuscated rendering of a digital credential when one or more conditions have not been satisfied, and then present a clear rendering of the digital credential when the conditions have been satisfied. An obfuscated rendering can be a visual rendering of the digital credential that has been sufficiently obfuscated (e.g., blurred, modified, etc.) such that the digital credential (e.g., scannable code) cannot be read and/or scanned by a scanning device or employee at the exhibitor location. In contrast, a clear rending of the digital credential is a visual rending of the digital credential that is sufficiently, clear such that the digital credential can be scanned by a scanning device and/or read by an employee at the exhibitor location. Accordingly, the visual rendering of the digital credential can be redeemed by the user after the conditions have been met.

In some embodiments, digital content misuse management application 116 continues to monitor the location of mobile computing device 202 and/or the current time and restrict access to the digital credentials if the conditions are no longer met. For example, if the user leaves the vicinity of the movie theatre and/or the specified period of time has passed. Digital content misuse management application 116 restricts access to the digital credentials by, for example, removing the clear rendering of the digital credential or replacing the clear rending of the digital credential with an obfuscated rendering of the digital credential.

In addition to restricting access to digital credentials until one or more conditions are satisfied, digital content misuse management application 116 further implements one or more security features into the visual rendering of the digital credential to prevent misuse. For example, digital content misuse management application 116 includes image data in the digital credential that, when rendered by mobile computing device 202, causes an image of the user associated with the user account to be presented along with the digital credential. An employee at an exhibitor location therefore visually verifies that the user attempting to redeem the digital credential is the user associated with the user account.

As another example, digital content misuse management application 116 includes video data in the digital credential that, when rendered by mobile computing device 202, causes a video and/or animation to be presented along with the digital credential. This can prevent users from creating counterfeit copies of the digital credential by taking a picture and/or screen grab of the rendered digital credential.

Service integration system 218 provides users with one or more integrated services in relation to a scheduled presentation of a digital content item. In various embodiments, service integration system 218 can be implemented as a standalone system and is not necessarily included in digital content delivery system 104. In some embodiments, mobile computing device 202 includes a portion of service integration system 218 (e.g., a portion of service integration system 218 included independently or in digital credential application 210). In embodiments where mobile computing device 202 includes a portion of service integration system 218, mobile computing device 202 works alone or in conjunction with the portion of the service integration system 218 included in digital content delivery system 104.

Service integration system 218 communicates with service provider system 220 to provide users with one or more integrated services in relation to a scheduled presentation of a digital content item. An integrated service is a service provided by one or more service providers. For example, an integrated service include transportation services, such as taxi services, car services, etc. As another example, an integrated service includes social networking services, such as posting data to a social networking service, generating an invitation or creating an event on a social networking service, etc.

Service provider system 220 include computing devices (e.g., computer servers) that provide a service. For example, service provider system 220 includes computer servers that provide a social network service and/or website (e.g., FACEBOOK, TWITTER, SNAPCHAT, etc.). As another example, service provider system 220 includes computer servers that provide transportation services (e.g., UBER, LYFT, etc.). Although only a single service provider system 220 is shown, this is just one example and is not meant to be limiting. System 200 can include any number of service provider systems, and this disclosure anticipates all such embodiments.

Service integration system 218 enables users to view and select from integrated services provided by the service integration system 218. For example, service integration system 218 presents users with an integrated service interface that lists the available integrated services and the cost to reserve or purchase the available integrated services. For example, the cost may include a monetary cost as well as a cost of digital credits. A user uses the integrated service interface to browse and/or select an integrated service.

In some embodiments, the integrated services presented to the user are based on a scheduled presentation that a user is attending, a geographic location of the user and/or a geographic location of the selected exhibitor location. For example, some integrated services are only available in certain geographic areas. Accordingly, service integration system 218 uses the geographic location of the user and/or the geographic location of the scheduled exhibitor location to present the user with integrated services that are available within the corresponding geographic area. As another example, some integrates service may only be available with respect to certain digital content items and/or scheduled presentations. Accordingly, service integration system 218 can use digital content item and/or the scheduled presentation to present the user with integrated services that are available.

Service integration system 218 communicates with service provider system 220 to provide a user with an integrated service. For example, service integration system 218 sends messages to service provider system 220 to request data, provide data, reserve services, etc. Likewise, service integration system 218 receives requests from service provider system 220. Service integration system 218 and service provider system 220 communicate using an Application Programming Interface (API) made available by service integration system 218 and/or service provider system 220.

Service integration system 218 presents any resulting output and/or data to a user in the integrated service interface. For example, service integration system 218 provides a user with confirmation and/or reservation information, as well as any updates of other data associated with the integrated service.

Service integration system 218 gathers and uses data to provide the user with an integrated service. For example, service integration system 218 gathers profile data describing the user from user account database 110. Profile data includes the user's name, address, account information (e.g., user name and password) to access a third-party service, etc. The profile data further includes digital content licenses and/or digital credentials assigned to the user's account, digital credits allocated to the user account, as well as associated metadata. For example, the associated metadata includes data describing the day and time of a scheduled presentation of a digital content item, as well as the address of a selected exhibitor location.

Service integration system 218 also gathers contextual data, such as the user's current location, the current time, etc. For example, service integration system 218 gathers contextual data, such as the user's current location, from mobile computing device 202. Mobile computing device 202 includes a Global Positioning System (GPS) component that can determine the current location of mobile computing device 202.

Service integration system 218 uses the gathered data to provide the user with an integrated service. For example, service integration system 218 uses the user's current location, the address of the selected exhibitor location and/or a start and end time of the scheduled presentation to schedule transportation to and/or from the scheduled presentation of the digital content item. As another example, service integration system 218 uses the time and location of the scheduled presentation to generate a social networking post to be displayed on a social networking site. For example, the generated social networking post indicates that the user is attending the scheduled presentation of the digital content item.

Figure 3:
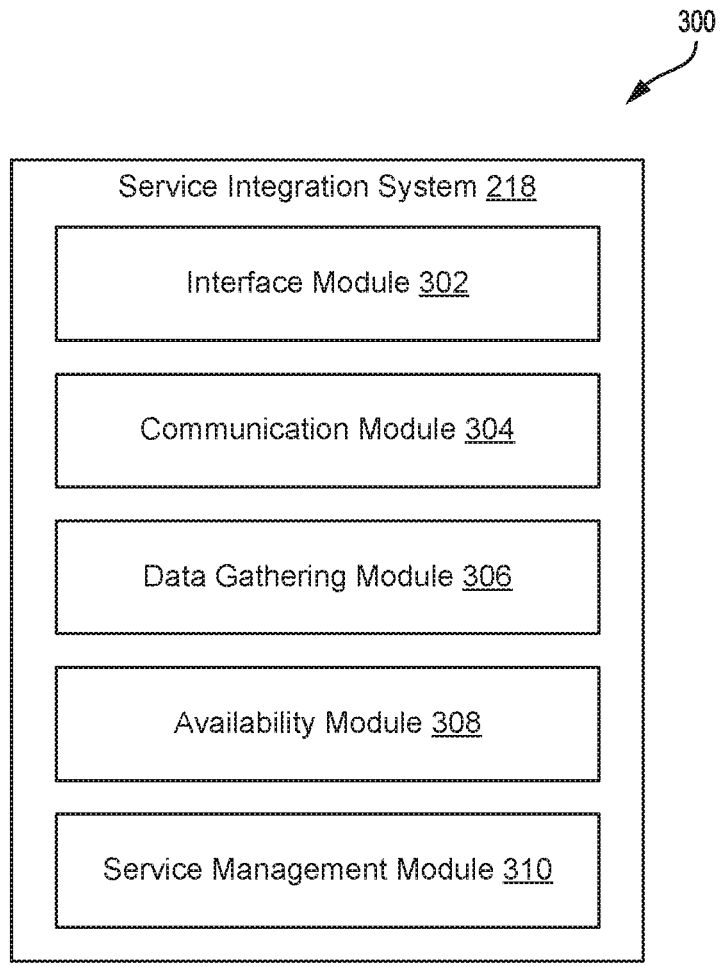
FIG. 3 is a block diagram of a service integration system, according to certain example embodiments.

FIG. 3 is a block diagram 300 of service integration system 218, according to certain example embodiments. Service integration system 218 is shown as including interface module 302, communication module 304, data gathering module 306, availability module 308 and service management module 310. The various modules of service integration system 218 are configured to communicate with each other (e.g., via a bus, shared memory, or a switch). Any one or more of these modules may be implemented using one or more computer processors (e.g., by configuring such one or more computer processors to perform functions described for that module) and hence may include one or more of the computer processors.

Any one or more of the modules described may be implemented using hardware alone (e.g., one or more of the computer processors 1004 of a machine (e.g., machine 1000)) or a combination of hardware and software. For example, any described module of service integration system 218 may physically include an arrangement of one or more of the computer processors 1004 (e.g., a subset of or among the one or more computer processors of the machine (e.g., machine 1000)) configured to perform the operations described herein for that module. As another example, any module of service integration system 218 may include software, hardware, or both, that configure an arrangement of one or more computer processors 1004 (e.g., among the one or more computer processors of the machine (e.g., machine 1000)) to perform the operations described herein for that module. Accordingly, different modules of service integration system 218 may include and configure different arrangements of such computer processors 1004 or a single arrangement of such computer processors 1004 at different points in time. Moreover, any two or more modules of service integration system 218 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Interface module 302 provides an integrated services interface that enables a user to view available integrated services and/or select to use one or more of the integrated services. For example, the integrated services interface includes a graphical user interface (GUI) including a visual presentation of the available integrated services, as well as user interface elements (e.g., buttons, text boxes, slider, etc.) that enable a user to select and request an integrated service, including customizing and/or providing additional input regarding the requested integrated service. A user uses the user interface elements to select a desired integrated service, as well as provide input for the desired integrated service.

The integrated services interface also present any additional data with respect to a requested and/or reserved integrated service. For example, the integrated services interface presents data received from service provider system 220, such as reservation data, update data, associated monetary and/or digital credit cost, etc.

Communication module 304 provides various communication functionality. For example, communication module 304 receives and transmits messages, requests, data, etc., with mobile computing device 202 and/or service provide system 220. Communication module 304 can transmit requests using an Application Programming interface (API) made available by the service provider system 220. For example, to communicate with service provider system 220, communication module 304 can identify the appropriate API used by service provider system 220. Communication module 304 can then use the identified API to communicate with service provider system 220. Accordingly, communication module 304 can use multiple APIs to communicate with various service provider systems 220 and provide multiple integrated services.

Data gathering module 306 gathers data that is used to provide the user with an integrated service. For example, data gathering module 306 gathers profile data from user account database 110. Profile data includes any data stored and/or associated with the user's account in user account database 110. Examples of profile data include data describing the user, such as the user's name, age, address, family members, purchase history, stored and/or derived preferences, financial information (e.g., credit card information, bank account information, allocated digital credits, etc.), etc. Other example of profile data include digital content licenses and/or digital credentials assigned to the user's account, including any associated metadata (e.g., exhibitor location, exhibitor address, scheduled start time, scheduled end time, etc.). Profile data further includes account data for services that the user uses (e.g., social networking services, food delivery services, transportation services, etc.). Account data includes the user's usernames and passwords to access the user's account for the corresponding services.

Data gathering module 306 also gathers exhibitor data from exhibitor management system 204. As explained above, exhibitor data includes data identifying the exhibitor locations associated with the exhibitor (e.g., movie theatres), the digital content items scheduled for presentation at each exhibitor location (e.g., movies), scheduled presentations at each exhibitor location (e.g., scheduled show times) and/or the associated monetary or digital credit cost of each scheduled presentation. Exhibitor data also includes data identifying digital credential availability for each scheduled presentation (e.g., number of unsold digital credentials available for purchase), seating charts for each exhibitor location, seating availability (e.g., unreserved seats), amenities provided by each exhibitor location, the address of each exhibitor location, etc. Exhibitor data also includes content associated with the exhibitor, exhibitor locations, and/or digital content items. For example, exhibitor data includes content such as written movie descriptions, movie trailers, movie reviews, movie theatre reviews, actors in a movie, movie directors, digital content item release dates, terms of use, etc.

Data gathering module 306 also gathers contextual data, such as the current time, the user's current location, etc. Data gathering module 306 communicates with mobile computing device 202 to gather contextual information, such as the user's current location.

Availability module 308 determines integrated services that are available to a user. Some integrated services may only be available in certain geographic areas, at certain times and/or in relation to select digital content items or exhibitor locations. For example, certain transportation services may only be available in certain geographic areas. As another example, services such as purchasing memorabilia may only be available with select movies. Accordingly, availability module 308 uses data gathered by data gathering module 306 to identify a set of integrated services that are available to the user based on the user's current location, the exhibitor location, digital content item and/or the time.

Availability module 308 also determines the integrated services that are available to the user based on services with which the user has an existing account as well as services that accept digital credits. For instance, a user may have an existing account with a transportation service that accepts digital credits to reserve services. Accordingly, availability module 308 can identify services for which the user has an existing account and present those integrated services to the user, rather than services that the user does not have an existing account with and/or do not accept digital credits as payment. Availability module 308 uses the profile data gathered by data gathering module 306 to identify the services that the user has existing accounts with.

Service management module 310 uses data gathered by data gathering module 306 to provide a user with an integrated service. For instance, to provide a user with transportation services to a scheduled presentation of a digital content item, service management module 310 provides the current location of the user along with the address of the exhibitor location to service provider system 220 that offers transportation services. Service provider system 220 uses the received data to schedule a pickup based on the user's current location and a drop off at the exhibitor location.

In some embodiments, service management module 310 uses the scheduled start time and/or scheduled end time of the scheduled presentation to schedule transportation services. For example, service management module 310 monitors the current time and at a specified time prior to the start time and/or end time of the scheduled presentation, transmits a request for the user to be picked up at the user's location.

Service management module 310 also provides payment information to schedule a service when needed. For instance, service management module 310 uses the user's financial information gathered by data gathering module 306 to complete a transaction for a service requested by the user. As another example, the service management module 310 provides data indicating that the user has utilized a specified number of digital credits to reserve and/or purchase the service.

In another example, service management module 310 generates and published posts to a social networking site used by the user. Service management module 310 uses the user's account information to access the user's account with the social networking service. Service management module 310 uses data gathered by data gathering module 306 to generate and publish a post to the social networking site. For instance, the post may indicate that the user is attending the scheduled presentation of the digital content item, as well as include additional details such as the time and location. Further, the social networking post may invite other users to join the user at the scheduled presentation of the digital content item, as well as provide links or other data to purchase digital credentials.

Although the example, of transportation services and social networking services are described, these are only two example and are not meant to be limiting. Service integration system 218 provides any number of integrates services and this disclosure anticipates all such embodiments. For instance, service integration system 218 provides transportation to and/or from an exhibitor location, purchase of memorabilia associated with the digital content item, posting to social networking sites, reserving seats, refreshments or other amenities, scheduling food delivery, etc.

Figure 4:
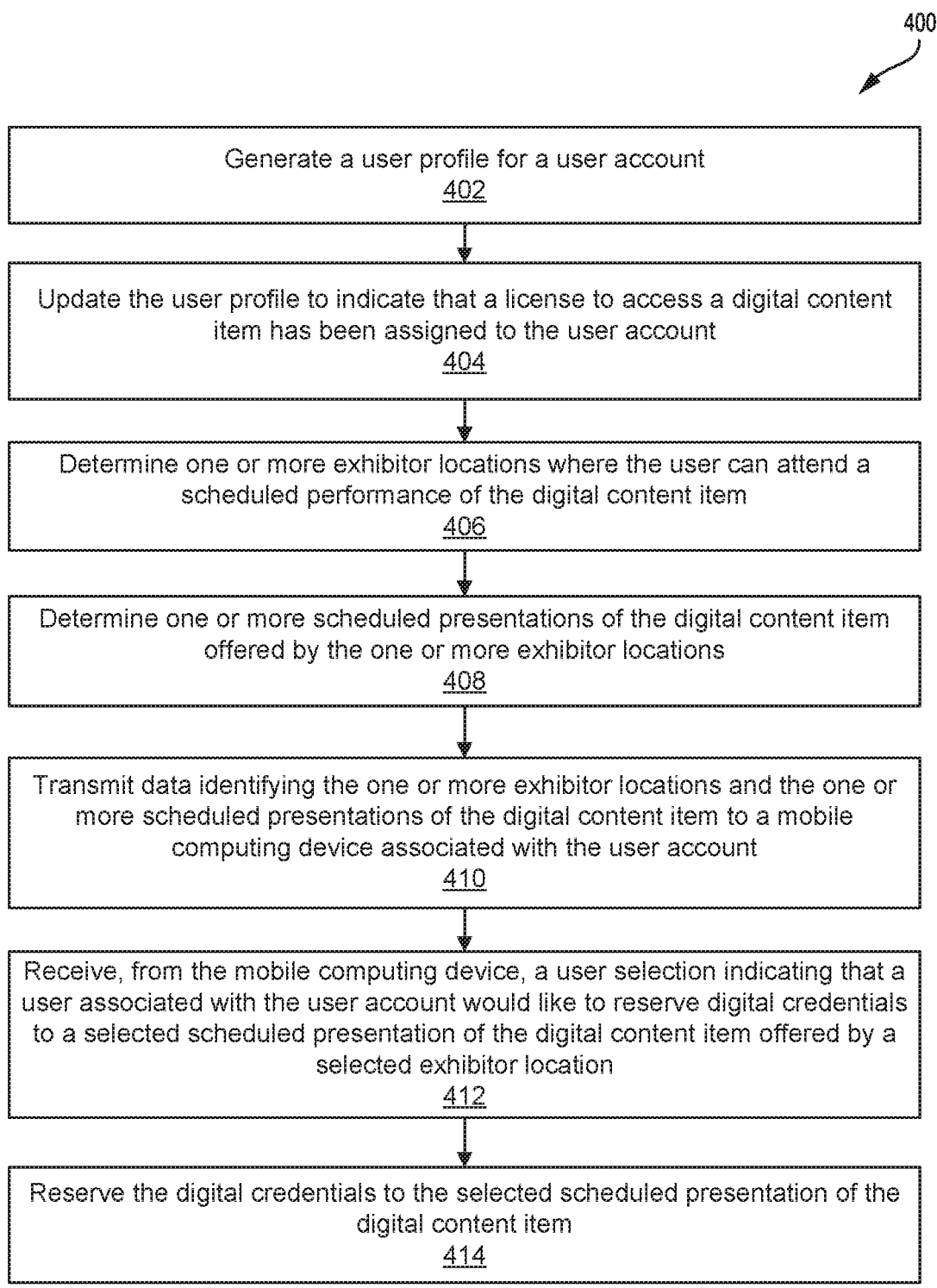
FIG. 4 is a flowchart showing an example method for reserving digital credentials to a scheduled presentation of a digital content item, according to certain example embodiments.

FIG. 4 is a flowchart showing an example method 400 for reserving digital credentials to a scheduled presentation of a digital content item, according to certain example embodiments. Method 400 may be embodied in computer readable instructions for execution by one or more computer processors such that the operations of method 400 may be performed in part or in whole by digital content delivery system 104; accordingly, method 400 is described below by way of example with reference thereto. However, it shall be appreciated that at least some of the operations of method 400 may be deployed on various other hardware configurations and method 400 is not intended to be limited to digital content delivery system 104.

At operation 402, digital content delivery system 104 generates a user profile for a user account. The generated user profile can be stored in user account database 110 maintained by digital content delivery system 104.

At operation 404, digital content delivery system 104 updates the user profile to indicate that a digital content license to access a digital content item has been assigned to the user account. For example, the digital content license can be a license to access and present a movie through client-side digital content delivery device 106 that associated with the user account. The digital content license can further enable a user to attend a scheduled performance of the digital content item.

At operation 406, digital content delivery system 104 determines one or more exhibitor locations where the user can attend a scheduled performance of the digital content item. Digital content delivery system 104 can determine an exhibitor associated with the digital content license assigned to the user account. For example, the exhibitor can be associated with the purchase of the digital content license and, in some embodiments, received a portion of revenue from the purchase for the digital content license to access the digital content item. Once digital content delivery system 104 determines the exhibitor associated with the digital content license, digital content delivery system 104 can determine exhibitor locations associated with the exhibitor. This include identifying all exhibitor locations associated with the exhibitor or a subset of the exhibitor locations. For example, digital content delivery system 104 can determine exhibitor locations that are located within a predetermined geographic distance of a dwelling associated with the user account.

At operation 408, digital content delivery system 104 determines one or more scheduled presentations of the digital content item offered by the one or more exhibitor locations. For example, digital content delivery system 104 can determine show times at which the digital content (e.g., movie) is playing at various movie theatres.

At operation 410, digital content delivery system 104 transmits data identifying the one or more exhibitor locations and the one or more scheduled presentations of the digital content item to mobile computing device 202 that is associated with the user account. Mobile computing device 202 can render a visual representation of the data and enable a user to browse through the available scheduled presentations as well as select to reserve digital credentials to a scheduled presentation.

At operation 412, digital content delivery system 104 receives, from mobile computing device 202, a user selection indicating that a user associated with the user account would like to reserve digital credentials to a selected scheduled presentation of the digital content item offered by a selected exhibitor location.

At operation 414, digital content delivery system 104 reserves the digital credentials to the selected scheduled presentation of the digital content item. For example, digital content delivery system 104 can transmit a reservation request to exhibitor management system 204 to reserve the digital credentials. Digital content delivery system 104 can additionally update the user's account to assign the reserved digital credentials to the users account. This include updating the user's account with any reservation data received from exhibitor management system 204.

Figure 11:
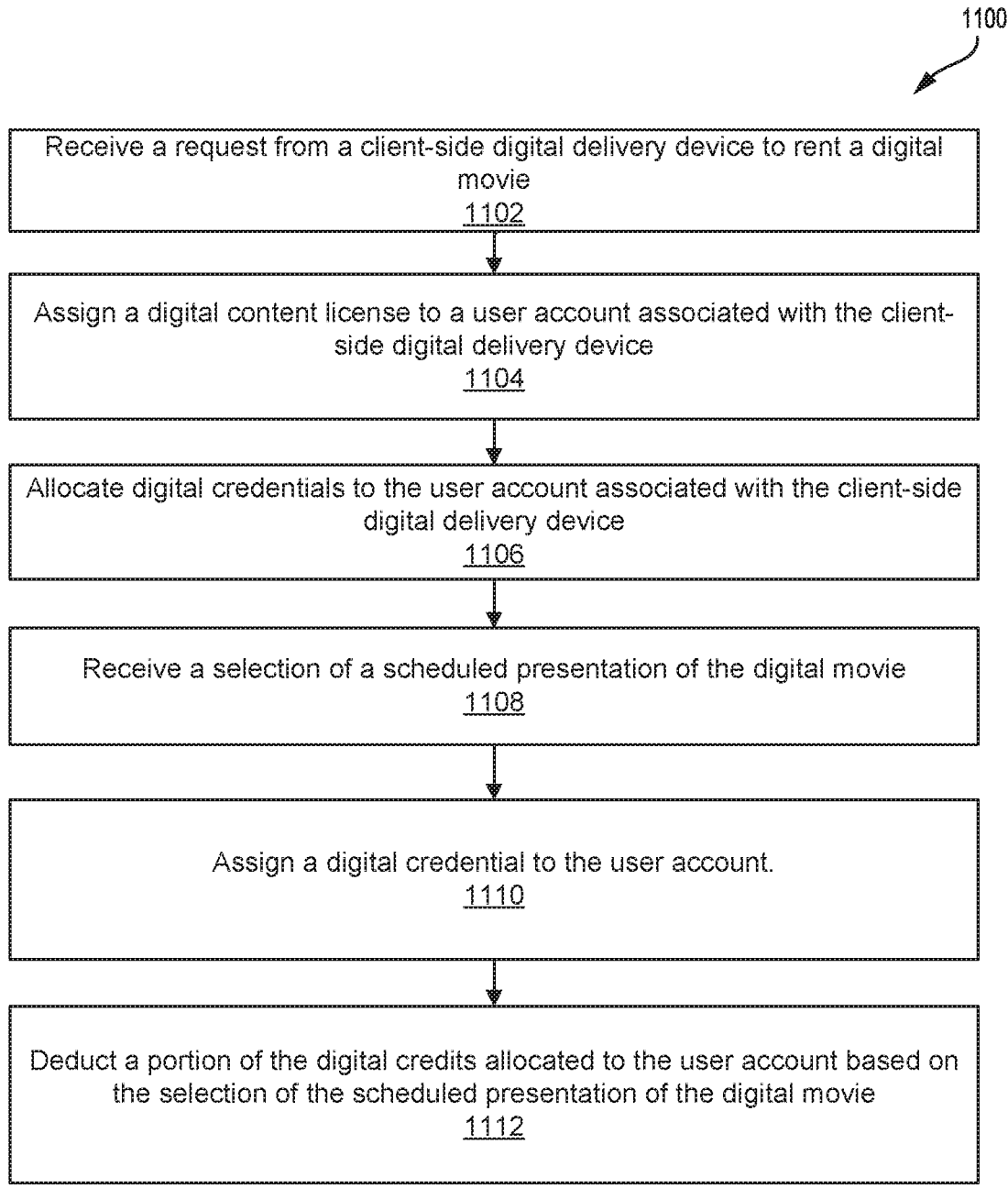
FIG. 11 is a flowchart showing an example method for using digital credits to reserve digital credentials to a scheduled presentation of a digital content item, according to certain example embodiments.

FIG. 11 is a flowchart showing an example method 1100 for using digital credits to reserve digital credentials to a scheduled presentation of a digital content item, according to certain example embodiments. Method 1100 may be embodied in computer readable instructions for execution by one or more computer processors such that the operations of method 1100 may be performed in part or in whole by digital content delivery system 104; accordingly, method 1100 is described below by way of example with reference thereto. However, it shall be appreciated that at least some of the operations of method 1100 may be deployed on various other hardware configurations and method 1100 is not intended to be limited to digital content delivery system 104.

At operation 1102, digital content delivery system 104 receives a request from client-side digital delivery device 106 to rent a digital movie. The request may have been transmitted as a result of the user of client-side digital delivery device 106 selecting the digital movie from a library or listing of available digital movies and authorizing payment for the rental using a user account associated with the client-side digital delivery device 106. The payment may be made using monetary funds, such as a credit card or checking account. Alternatively, payment may be made using digital credits allocated to the user account associated with client-side digital delivery device 106.

At operation 1104, digital content delivery system 104 assigns a digital content license to the user account associated with client-side digital delivery device. 106 The digital content license enables client-side digital delivery device 106 to stream the digital movie for a specified period of time. For example, the digital content license may enable client-side digital delivery device 106 to stream the digital movie for a 24-hour or 48-hour period of time.

At operation 1106, digital content delivery system 104 allocates digital credits to the user account associated with client-side digital delivery device 106. The digital credits are digital funds that may be redeemed to complete transactions, such as renting and/or purchasing digital movies, purchasing digital credentials to attend a scheduled presentation of the digital movie at an exhibitor location, reserving related services. Allocation of digital credits may, be used to incentivize users to purchase and/or rent movies, content items, services. For example, the digital credits may be allocated as part of a loyalty rewards program.

The amount of digital credits allocated to the user per transaction account may vary based on one or more factors. For example, each digital movie and/or transaction type (e.g., rental, purchase) may be associated with a predetermined amount of digital credits to be allocated for purchasing and/or renting the digital movie. As another example, the amount of digital credits allocated may vary based on a usage history of the user. For example, the user may be allocated more digital credits for meeting certain usage milestones, such as meeting a threshold number of transaction or threshold amount of monetary funds spent.

At operation 1108, digital content delivery system 104, receives a selection of a scheduled presentation of the digital movie. The scheduled presentation may be a live showing of the digital movie at a movie theater. The user may select the scheduled presentation from a listing of scheduled presentations that is presented to the user. The listing may include associated costs to attend each scheduled presentation, such as a monetary cost or a number of digital credits needed to attend. The listing may also enable the user to select to attend a scheduled presentation, as well as choose the method for providing payment, such as paying the monetary cost or using digital credits.

At operation 1110, digital content delivery system 104, assigns a digital credential to the user account. The digital credential is a digital ticket that the user may redeem at the exhibitor location to gain access to view the scheduled presentation of the digital movie.

At operation 1112, digital content delivery system 104 deducts a portion of the digital credits allocated to the user account based on the selection of the scheduled presentation of the digital movie. For example, digital content delivery system 104 deducts the number of digital credits needed to attend the scheduled presentation. Digital content delivery system 104 deducts the portion of digital credits by updating the user's profile by modifying the number of digital credits that are allocated to the user account.

Figure 5:
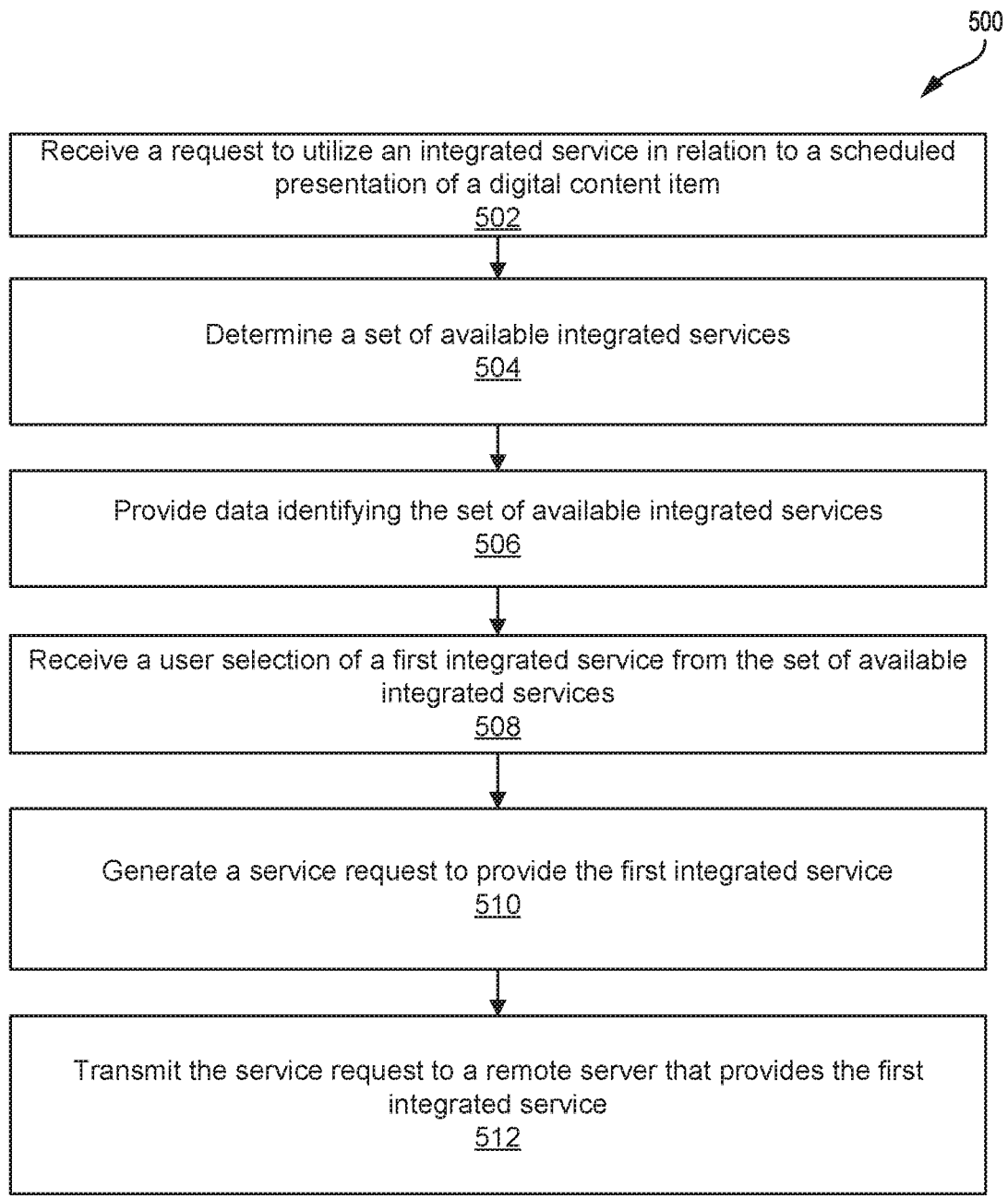
FIG. 5 is a flowchart showing an example method for providing an integrated service in relation to a scheduled presentation of a digital content item, according to certain example embodiments.

FIG. 5 is a flowchart showing an example method 500 for providing an integrated service in relation to a scheduled presentation of a digital content item, according to certain example embodiments. Method 500 may be embodied in computer readable instructions for execution by one or more computer processors such that the operations of method 500 may be performed in part or in whole by service integration system 218; accordingly, method 500 is described below by way of example with reference thereto. However, it shall be appreciated that at least some of the operations of method 500 may be deployed on various other hardware configurations and method 500 is not intended to be limited to service integration system 218.

At operation 502, communication module 304 receives a request to use an integrated service in relation to a scheduled presentation of a digital content item. An integrated services interface presented on mobile computing device 202 enables a user to select to use an integrated service, resulting in the request. A digital credential to attend the scheduled presentation of the digital content item is previously assigned to a user account associated with mobile account 202.

At operation 504, availability module 308 determines a set of available integrated services. Availability module 308 determines the set of available integrated service based on the scheduled presentation of the digital content item. The availability module 308 identifies the scheduled presentation of the digital content item based on the digital credential assigned to the user account.

To determine the set of available integrated services, in one example availability module 308 determines a geographic location of the exhibitor location, and then identifies integrated services that are available within a predetermined distance of the geographic location of the exhibitor location. As another example, availability module 308 gathers profile data from the user account, and identifies integrated services to which the user has an existing account based on the profile data. In some embodiments.

At operation 506, communication module 304 provides data identifying the set of available integrated services to mobile computing device 202. Mobile computing device 202 presents the set of available to the integrated services interface, enabling a user to view and/or select an integrated service.

At operation 508, communication module 304 receives a user selection of a first integrated service from the set of available integrated services. The user selection is received from mobile computing device 202 as a result of the user using the integrated services interface to select the first integrated service. The first integrated service is any type of available integrated service, such as transportation to an exhibitor location, generating a post to a social networking service, selecting seats, purchasing amenities, etc.

At operation 510, service management module 310 generates a service request to provide the first integrated service. Service management module 310 generates the service request according to an Application Programming Interface (API) associated with the first integrated service. Service management module 310 uses data gathered by data gathering module 306 to generate the service request. Examples of the gathered data include the user's current location, a scheduled start time of the scheduled presentation, the exhibitor location, etc.

At operation 512, communication module 304 transmits the service request to a remote server that provides the first integrated service. The remote server provides the requested service in response to the service request.

Figure 12:
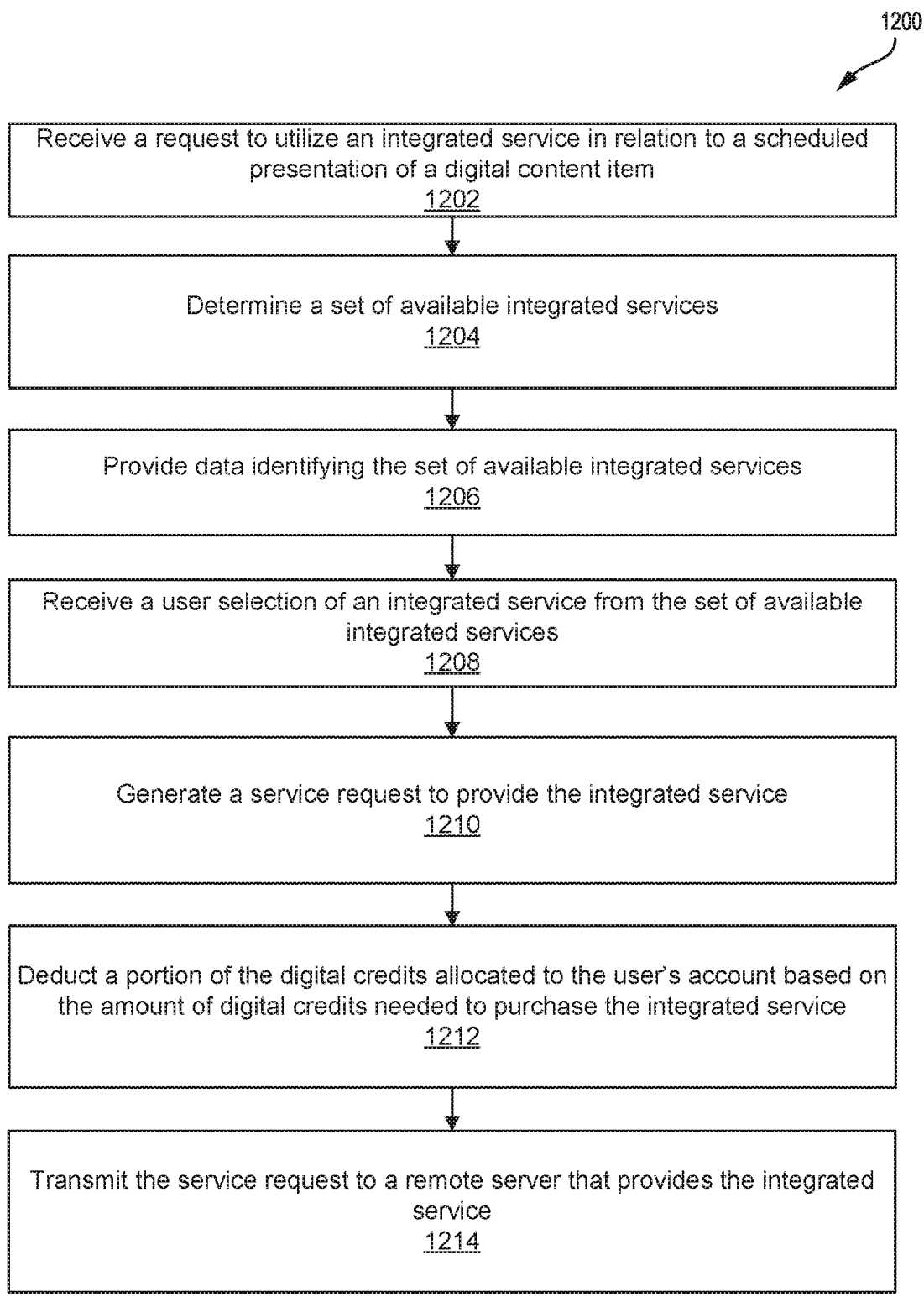
FIG. 12 is a flowchart showing an example method 1200 for using digital credits to provide an integrated service in relation to a scheduled presentation of a digital content item, according to certain example embodiments.

FIG. 12 is a flowchart showing an example method 1200 for using digital credits to provide an integrated service in relation to a scheduled presentation of a digital content item, according to certain example embodiments. Method 1200 may be embodied in computer readable instructions for execution by one or more computer processors such that the operations of method 1200 may be performed in part or in whole by service integration system 218; accordingly, method 1200 is described below by way of example with reference thereto. However, it shall be appreciated that at least some of the operations of method 1200 may be deployed on various other hardware configurations and method 1200 is not intended to be limited to service integration system 218.

At operation 1202, communication module 304 receives a request to use an integrated service in relation to a scheduled presentation of a digital content item. An integrated services interface presented on mobile computing device 202 enables a user to select to use an integrated service, resulting in the request. A digital credential to attend the scheduled presentation of the digital content item is previously assigned to a user account associated with mobile account 202.

At operation 1204, availability module 308 determines a set of available integrated services. Availability module 308 determines the set of available integrated service based on the scheduled presentation of the digital content item. The availability module 308 identifies the scheduled presentation of the digital content item based on the digital credential assigned to the user account.

To determine the set of available integrated services, in one example availability module 308 determines a geographic location of the exhibitor location, and then identifies integrated services that are available within a predetermined distance of the geographic location of the exhibitor location. As another example, availability module 308 gathers profile data from the user account, and identifies integrated services to which the user has an existing account based on the profile data. In some embodiments.

At operation 1206, communication module 304 provides data identifying the set of available integrated services to mobile computing device 202. Mobile computing device 202 presents the set of available to the integrated services interface; enabling a user to view and/or select an integrated service. The integrated services interface may include a cost associated with reserving the listed integrates services. For example; the cost may include a monetary a cost as well as a cost in digital credits.

At operation 1208, communication module 304 receives a user selection of a first integrated service from the set of available integrated services. The user selection is received from mobile computing device 202 as a result of the user using the integrated services interface to select the first integrated service. The first integrated service is any type of available integrated service, such as transportation to an exhibitor location, generating a post to a social networking service, selecting seats, purchasing amenities, etc. The user selection may also indicate the method of payment that the user wishes to use, such as monetary credits (e.g., credit card, checking account, etc.) or digital credits.

At operation 1210, service management module 310 generates a service request to provide the first integrated service. Service management module 310 generates the service request according to an Application Programming Interface (API) associated with the first integrated service. Service management module 310 uses data gathered by data gathering module 306 to generate the service request. Examples of the gathered data include the user's current location, a scheduled start time of the scheduled presentation, the exhibitor location, etc.

At operation 1212, service integration system 218 deducts a portion of the digital credits allocated to the user's account based on the amount of digital credits needed to purchase the integrated service. For example, service integration system 218 causes the user's profile to be modified to reflect the change in the number or digital credits allocated to the user's account.

At operation 1214, communication module 304 transmits the service request to a remote server that provides the first integrated service. The remote server provides the requested service in response to the service request.

Figure 6:
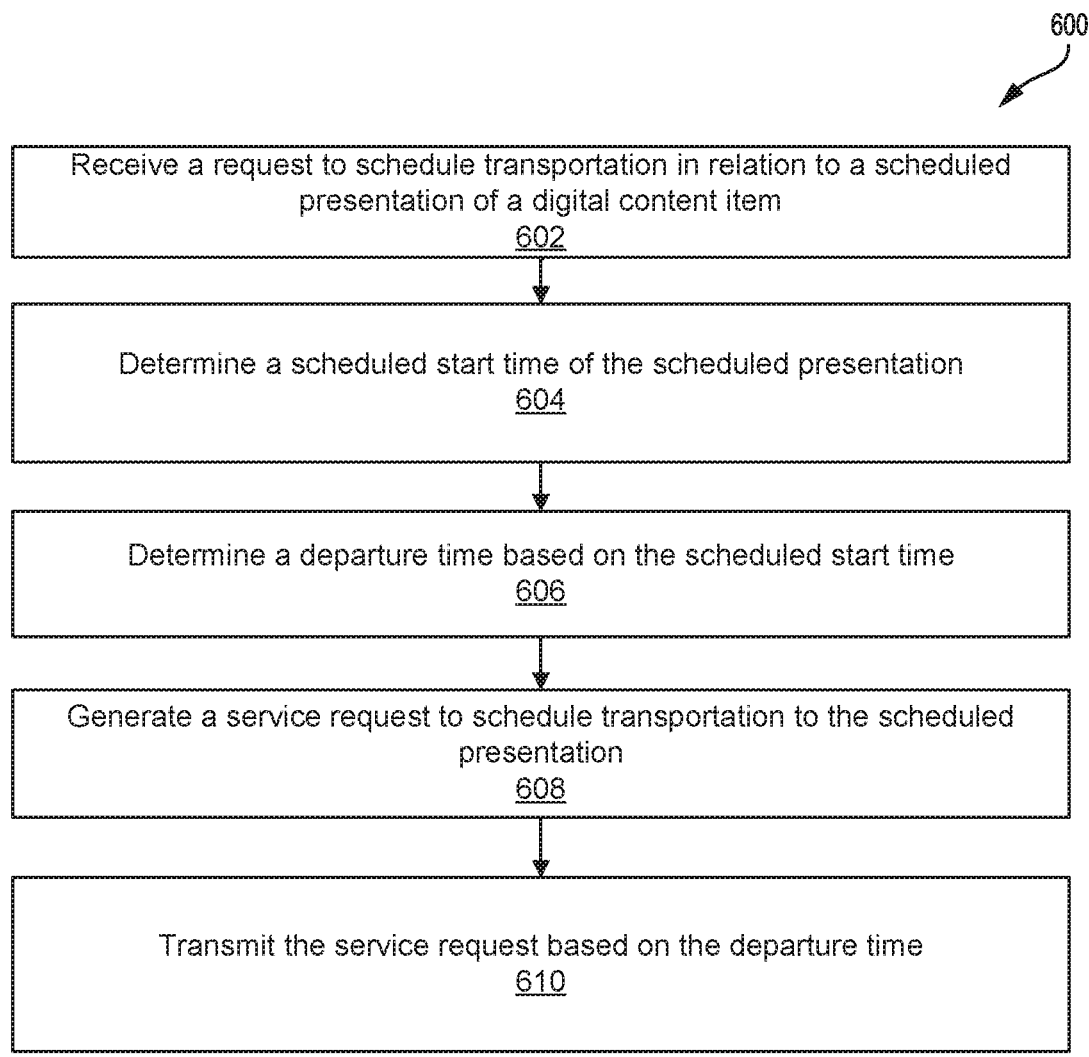
FIG. 6 is a flowchart showing an example method for providing transportation services in relation to a scheduled presentation of a digital content item, according to certain example embodiments.

FIG. 6 is a flowchart showing an example method 600 for providing transportation services in relation to a scheduled presentation of a digital content item, according to certain example embodiments. Method 600 may be embodied in computer readable instructions for execution by one or more computer processors such that the operations of method 600 may be performed in part or in whole by service integration system 218; accordingly, method 600 is described below by way of example with reference thereto. However, it shall be appreciated that at least some of the operations of method 600 may be deployed on various other hardware configurations and method 600 is not intended to be limited to service integration system 218.

At operation 602, communication module 304 receives a request to schedule transportation in relation to a scheduled presentation of a digital content item. An integrated services interface presented on mobile computing device 202 enables a user to select to use an integrated service, resulting in the request. A digital credential to attend the scheduled presentation of the digital content item is previously assigned to a user account associated with mobile account 202.

At operation 604, service management module 310 determines a scheduled start time of the scheduled presentation. Service management module 310 determines the scheduled start time from data gathered by data gathering module 306 from the user's profile and/or exhibitor management system 204.

At operation 606, service management module 310 determines a departure time based on the scheduled start time. The departure time is mean to provide the user with sufficient time to travel to the exhibitor location prior to the scheduled start time. In some embodiments, service management module 310 determines an estimated travel time based on the current location of the user, the exhibitor location and/or an estimated travel time.

At operation 608, service management module 310 generates a service request to schedule transportation to the scheduled presentation. The service request includes the user's current location as well as the destination (e.g., exhibitor location).

At operation 610, communication module 304 transmits the service request based on the departure time. For instance, communication module 304 transmits the service request at the departure time or a predetermined amount of time prior to the departure time to allow for a car to arrive by the departure time.

Figure 7:
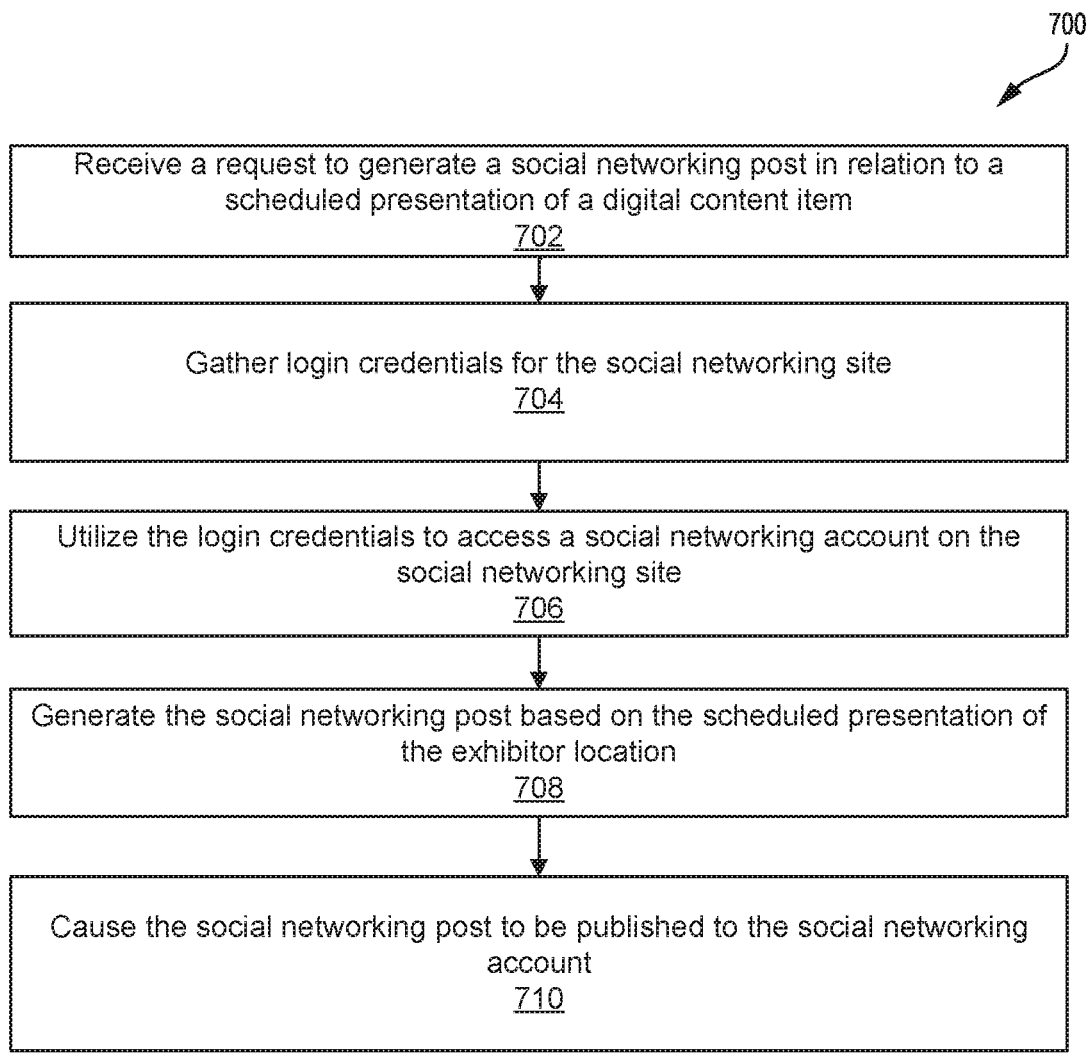
FIG. 7 is a flowchart showing an example method for providing social networking services in relation to a scheduled presentation of a digital content item, according to certain example embodiments.

FIG. 7 is a flowchart showing an example method 700 for providing social networking services in relation to a scheduled presentation of a digital content item, according to certain example embodiments. Method 700 may be embodied in computer readable instructions for execution by one or more computer processors such that the operations of method 700 may be performed in part or in whole by service integration system 218; accordingly, method 700 is described below by way of example with reference thereto. However, it shall be appreciated that at least some of the operations of method 700 may be deployed on various other hardware configurations and method 700 is not intended to be limited to service integration system 218.

At operation 702, communication module 304 receives a request to generate a social networking post in relation to a scheduled presentation of a digital content item. An integrated services interface presented on mobile computing device 202 enables a user to select to use an integrated service, resulting in the request. A digital credential to attend the scheduled presentation of the digital content item is previously assigned to a user account associated with mobile account 202.

At operation 704, data gathering module 306 gathers login credentials for the social networking site. Data gathering module 306 gathers the login credentials from a user's profile in user account database 110.

At operation 706, service management module 310 uses the login credentials to access a social networking account on the social networking site. The social networking account being associated with the user.

At operation 708, service management module 310 generates the social networking post based on the scheduled presentation of the exhibitor location. The social networking post indicates that the user is attending the scheduled presentation of the digital content item. For instance, the social networking post identifies the digital content item, exhibitor location and or scheduled start time of the scheduled presentation.

At operation 710, service management module 310 causes the social networking post to be published to the social networking account. Accordingly, the user's contacts on the social networking site will be made aware that the user is attending the scheduled presentation of the digital content item.

Figure 8A:
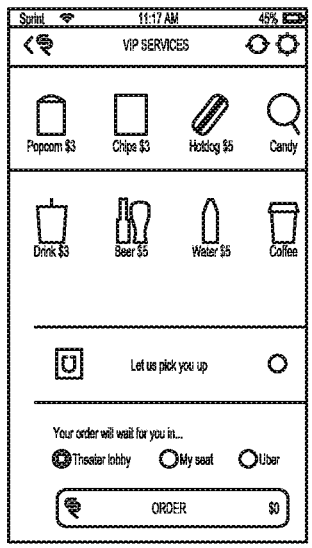
FIGS. 8A-8L are screenshots showing example screenshots of an exhibitor interface, according to certain example embodiments.

FIGS. 8A-8L FIGS. 8A-8L are screenshots showing example screenshots of an exhibitor interface, according to certain example embodiments. As shown in FIG. 8A, the exhibitor interface can enable a user to reserve one or more amenities. For example, the user can use the exhibitor interface to select from and purchase food and/or beverages, as well as select a pickup location for the purchased food and/or beverages. The exhibitor interface can also user can also allow a user to schedule transportation to and/or from a scheduled presentation of a digital content item.

Figure 8B:
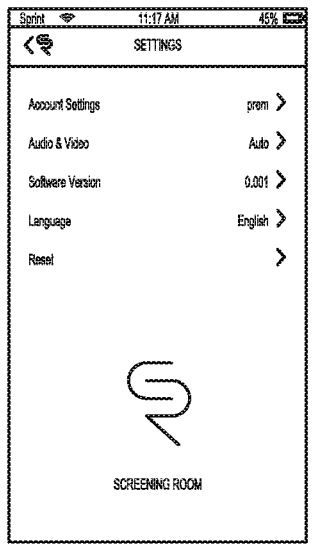

As shown in FIG. 8B, the exhibitor interface can allow a user to view and/or adjust configurations or settings. For example, the exhibitor interface can allow the user to view and/or adjust account settings, audio and video settings, software version and language settings. The exhibitor interface can also allow the user to reset the settings to their default settings.

Figure 8C:
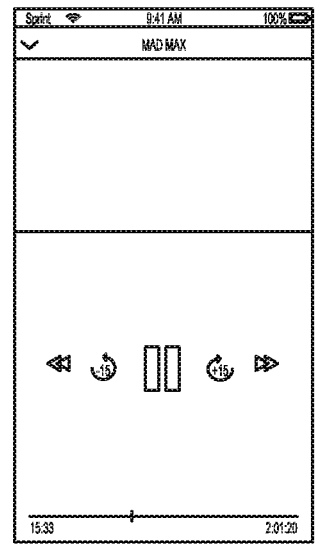

As shown in FIG. 8C, the exhibitor interface can present a user with video. For example, the exhibitor interface can allow the user to view movie trailers, reviews, etc. The exhibitor interface can also allow the user to control presentation of the video, such as fast forward, rewind, pause, play, etc.

Figure 8D:
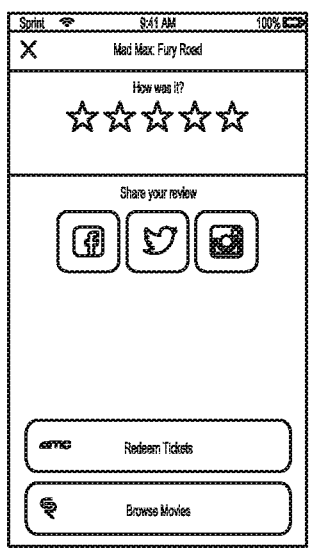

As shown in FIG. 8D, the exhibitor interface can enable the user to perform one or more functions. For example, the exhibitor interface can enable the user to review a digital content item, share the review via one or more social networking services, redeem digital credentials and/or browse movies.

Figure 8E:
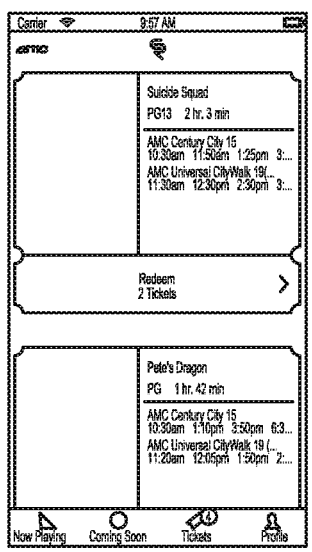

As shown in FIG. 8E, the exhibitor interface provides the user with identifying scheduled presentations of digital content items. For example, the exhibitor interface provides the user with movie title descriptions, available locations and/or times. The exhibitor interface can also enable a user to select to reserve digital credentials to a selected movie.

Figure 8F:
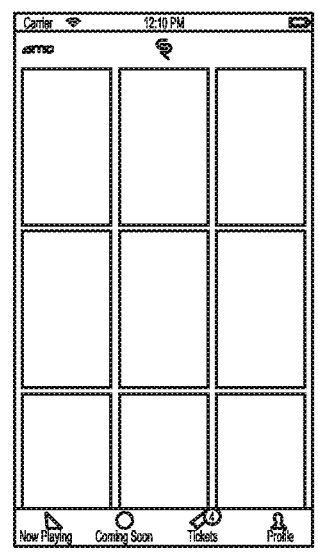

As shown in FIG. 8F, the exhibitor interface can present the user with multiple data tiles that include data and that can be selectable by a user. For example, each data tile includes data associated with a movie, such as images associated with the movie, description text, etc. Further, each data tile can be selectable to enable the user to access additional data.

Figure 8G:
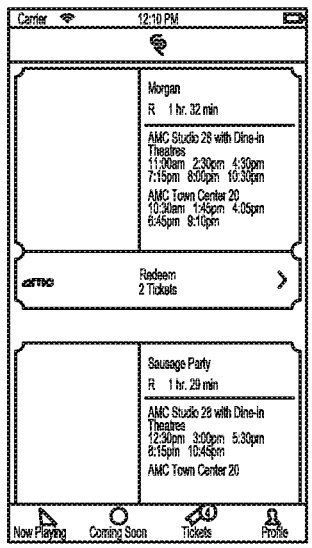

As shown in FIG. 8G, the exhibitor interface provides the user with data identifying scheduled presentations of digital content items. For example, the exhibitor interface provides the user with movie title descriptions, available locations and/or times. The exhibitor interface can also enable a user to select to reserve digital credentials to a selected movie.

Figure 8H:
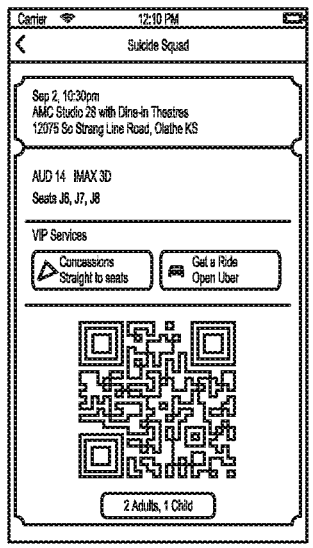

As shown in FIG. 8H, the exhibitor interface can present a visual rendering of a digital credential, such as a R code. The visual rendering of the digital credential can allow a user to redeem the digital credential at an exhibitor location.

Figure 8I:

As shown in FIG. 8I, the exhibitor interface provides a user with a detailed written description of a movie. This includes a plot synopsis as well as a listing of key actors/actresses in the movie and the director.

Figure 8J:
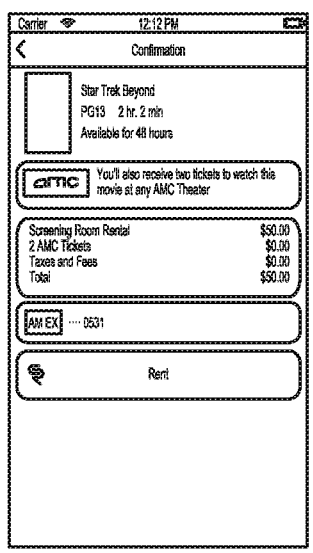

As shown in FIG. 8J the exhibitor interface can enable a user to purchase digital credentials and/or a digital content license. As show, the exhibitor interface can enable the user to enter payment method data, such as credit card information. The exhibitor interface can also provide the user with the total cost for the requested purchase.

Figure 8K:
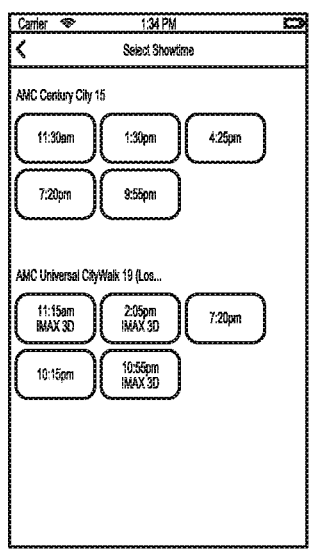

As shown in FIG. 8K, the exhibitor interface can present the user with data tiles representing scheduled presentations of a digital content item. Each data tile includes data describing its respective scheduled presentation, such as the scheduled start time of the scheduled presentation. Further, the data tiles can be interactive such that a user can select a data tile to receive addition information regarding the corresponding scheduled presentation and/or to reserve digital credentials for the scheduled presentation.

Figure 8L:
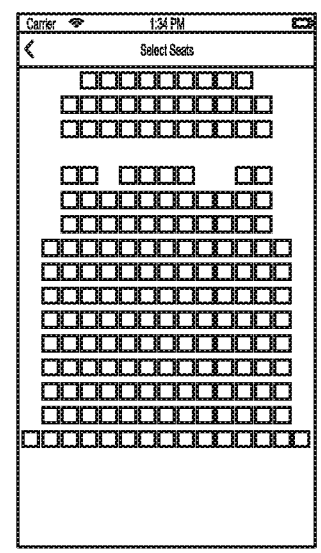

As shown in FIG. 8L, the exhibitor interface can present the user with a seating map identifying the seats at an exhibitor location. The seating map can indicate which seats are reserved and which seats remain available. The seating map can be interactive to allow a user to reserve seats.

Software Architecture

Figure 9:
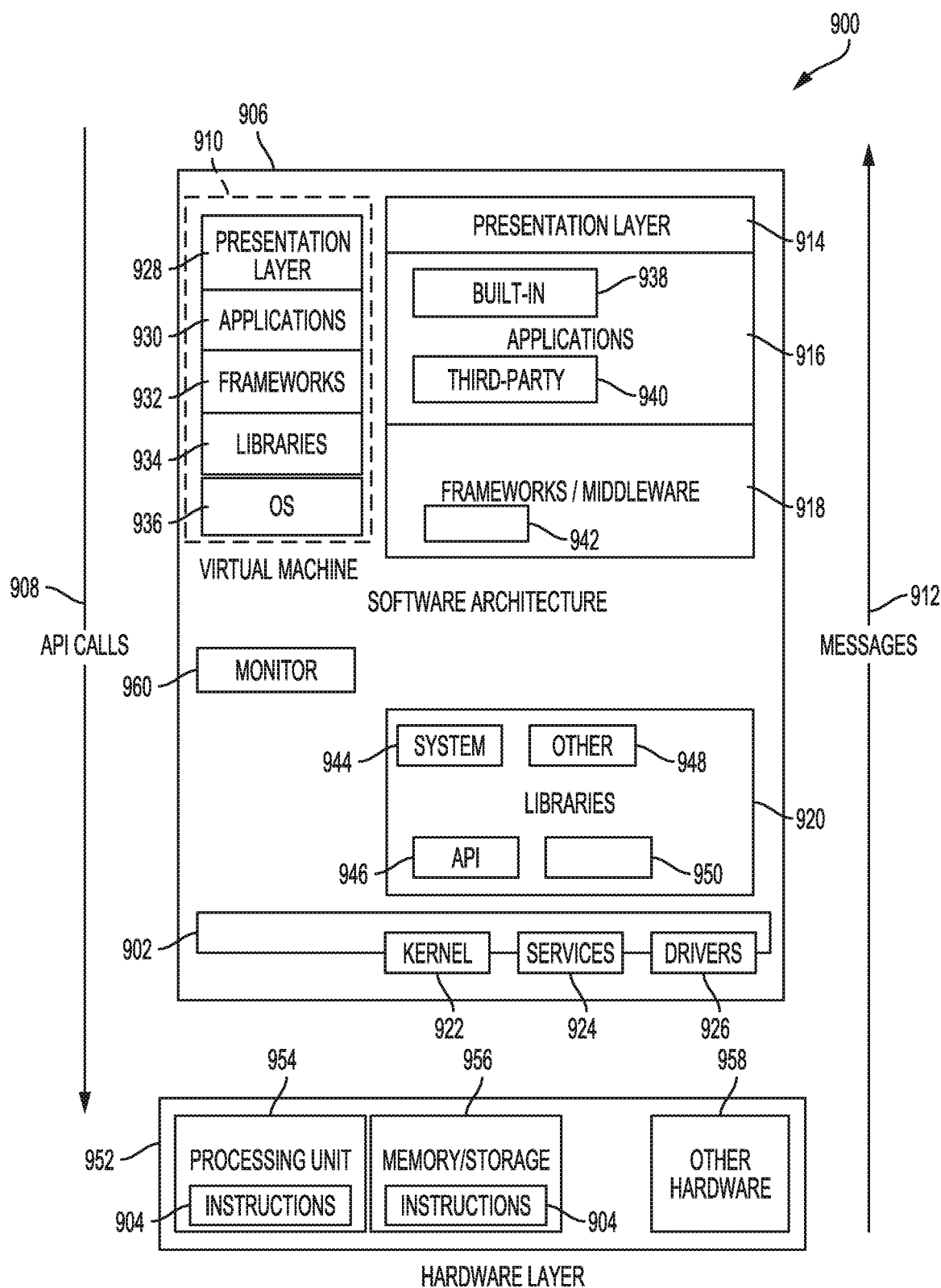
FIG. 9 is a block diagram illustrating a representative software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. Software architecture 906 may execute on hardware such as machine 1000 of FIG. 10 that includes, among other things, processors 1004, memory 1014, and input/output (I/O) components 1018. A representative hardware layer 952 is illustrated and can represent, for example, machine 1000 of FIG. 10. Representative hardware layer 952 includes processing unit 954 having associated executable instructions 904. Executable instructions 904 represent the executable instructions of software architecture 906, including implementation of the methods, modules and so forth described herein. Hardware layer 952 also includes memory and/or storage modules memory/storage 956, which also have executable instructions 904. Hardware layer 952 may also comprise other hardware 958.

In the example architecture of FIG. 9, software architecture 906 may be conceptualized as a stack of layers where each layer provides particular functionality. For example, software architecture 906 may include layers such as operating system 902, libraries 920, applications 916 and a presentation layer 914. Operationally, applications 916 and/or other components within the layers may invoke application programming interface (API) calls 908 through the software stack and receive a response as in response to API calls 908. The layers illustrated are representative in nature and not all software architectures have all layers. For example, some mobile or special purpose operating systems may not provide frameworks/middleware 918, while others may provide such a layer. Other software architectures may include additional or different layers.

Operating system 902 may manage hardware resources and provide common services. Operating system 902 may include, for example, kernel 922, services 924, and drivers 926. Kernel 922 may act as an abstraction layer between the hardware and the other software layers. For example, kernel 922 may be responsible for memory management, processor management (e.g., scheduling), component management, networking, security settings, and so on. Services 924 may provide other common services for the other software layers. Drivers 926 may be responsible for controlling or interfacing with the underlying hardware. For instance, drivers 926 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

Libraries 920 may provide a common infrastructure that may be used by applications 916 and/or other components and/or layers. Libraries 920 typically provide functionality that allows other software modules to perform tasks in an easier fashion than to interface directly with the underlying operating system 902 functionality (e.g., kernel 922, services 924 and/or drivers 926), Libraries 920 may include system libraries 944 (e.g., C standard library) that may provide functions such as memory allocation functions, string manipulation functions, mathematic functions, and the like. In addition, libraries 920 may include API libraries API 946 such as media libraries (e.g., libraries to support presentation and manipulation of various media format such as MPREG4, H.264, MP3, AAC, AMR, NG, PNG), graphics libraries (e.g., an OpenGL framework that may be used to render 2D and 3D in a graphic movie on a display), database libraries (e.g., SQLite that may provide various relational database functions), web libraries (e.g., WebKit that may provide web browsing functionality), and the like. Libraries 920 may also include a wide variety of other libraries 950 to provide many other APIs to applications 916 and other software components/modules.

The frameworks/middleware 918 (also sometimes referred to as middleware) provide a higher-level common infrastructure that may be used by, applications 916 and/or other software components/modules. For example, frameworks/middleware 918 may provide various graphic user interface (GUI) functions, high-level resource management, high-level location services, and so forth. Frameworks/middleware 918 may provide a broad spectrum of other APIs that may be used by applications 916 and/or other software components/modules, some of which may be specific to a particular operating system or platform.

Applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include any application developed using the Android™ or iOS™ software development kit (SDK) by an entity other than the vendor of the particular platform, and may be mobile software running on a mobile operating system such as iOS™, Android™, Windows® Phone, or other mobile operating systems. Third-party applications 940 may invoke the API calls 908 provided by the mobile operating system such as operating system 902 to facilitate functionality described herein.

Applications 916 may use built-in operating system functions (e.g., kernel 922, services 924 and/or drivers 926), libraries 920, frameworks/middleware 918 to create user interfaces to interact with users of the system. Alternatively, or additionally, in some systems interactions with a user may occur through a presentation layer, such as presentation layer 914. In these systems, the application/module "logic" can be separated from the aspects of the application/module that interact with a user.

Some software architectures use virtual machines. In the example of FIG. 9, this is illustrated by virtual machine 910. Virtual machine 910 creates a software environment where applications/modules can execute as if they were executing on a hardware machine (such as the machine 1000 of FIG. 10, for example). Virtual machine 910 is hosted by a host operating system (operating system (OS) 936 in FIG. 9) and typically, although not always, has a virtual machine monitor 960, which manages the operation of virtual machine 910 as well as the interface with the host operating system (i.e., operating system 902). A software architecture executes within the virtual machine 910 such as operating system (OS) 936, libraries 934, frameworks 932, applications 930 and/or presentation layer 928. These layers of software architecture executing within the virtual machine 910 can be the same as corresponding layers previously described or may be different.

Figure 10:
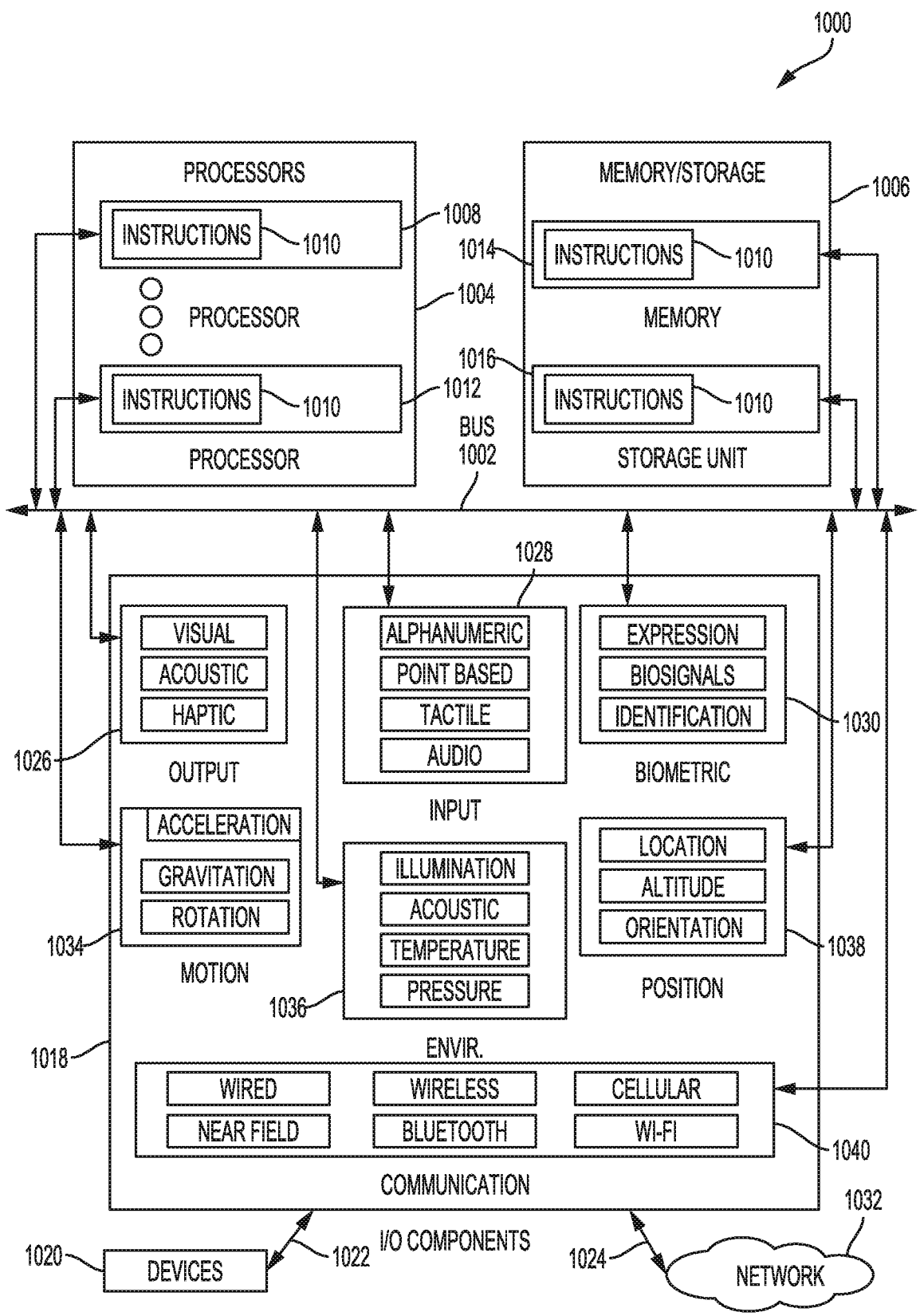
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of machine 1000, according to some example embodiments, able to read instructions from a machine-readable medium (e.g., a machine-readable storage medium) and perform any one or more of the methodologies discussed herein. Specifically, FIG. 10 shows a diagrammatic representation of machine 1000 in the example form of a computer system, within which instructions 1010 (e.g., software, a program, an application, an applet, an app, or other executable code) for causing machine 1000 to perform any one or more of the methodologies discussed herein may be executed. As such, the instructions 1010 may be used to implement modules or components described herein. The instructions 1010 transform the general, non-programmed machine into a particular machine programmed to carry out the described and illustrated functions in the manner described. In alternative embodiments, machine 1000 operates as a standalone device or may be coupled (e.g., networked) to other machines. In a networked deployment, machine 1000 may operate in the capacity of a server machine or a client machine in a server-client network environment, or as a peer machine in a peer-to-peer (or distributed) network environment. Machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile computing device, a wearable device (e.g., a smart watch), a smart home device (e.g., a smart appliance), other smart devices, a web appliance, a network router, a network switch, a network bridge, or any machine capable of executing instructions 1010, sequentially or otherwise, that specify actions to be taken by machine 1000. Further, while only a single machine 1000 is illustrated, the term "machine" shall also be taken to include a collection of machines that individually or jointly execute instructions 1010 to perform any one or more of the methodologies discussed herein.

Machine 1000 may include processors 1004, memory/storage 1006, and input/output (I/O) components 1018, which may be configured to communicate with each other such as via bus 1002. Memory/storage 1006 may include memory 1014, such as a main memory, or other memory storage, and storage unit 1016, both accessible to processors 1004 such as via bus 1002. Storage unit 1016 and memory 1014 store instructions 1010 embodying any one or more of the methodologies or functions described herein. Instructions 1010 may also reside, completely or partially, within memory 1014, within storage unit 1016, within at least one of processors 1004 (e.g., within the processor's cache memory), or any suitable combination thereof, during execution thereof by the machine 1000. Accordingly, memory 1014, storage unit 1016, and memory of processors 1004 are examples of machine-readable media.

The input/output (I/O) components 1018 may include a wide variety of components to receive input, provide output, produce output, transmit information, exchange information, capture measurements, and so on. The specific input/output (I/O) components 1018 that are included in a particular machine will depend on the type of machine. For example, portable machines such as mobile phones will likely include a touch input device or other such input mechanisms, while a headless server machine will likely not include such a touch input device. It will be appreciated that input/output (I/O) components 1018 may include many other components that are not shown in FIG. 10. Input/output (I/O) components 1018 are grouped according to functionality merely for simplifying the following discussion and the grouping is in no way limiting. In various example embodiments, input/output (I/O) components 1018 may include output components 1026 and input components 1028. Output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. Input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, input/output (I/O) components 1018 may include biometric components 1030, motion components 1034, environmental components 1036, or position components 1038 among a wide array of other components. For example, biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. Motion components 1034 may include acceleration sensor components (e.g., accelerometer), gravitation sensor components, rotation sensor components (e.g., gyroscope), and so forth. Environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. Position components 1038 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. Input/output (I/O) components 1018 may include communication components 1040 operable to couple the machine 1000 to network 1032 or devices 1020 via coupling 1022 and coupling 1024, respectively. For example, communication components 1040 may include a network interface component or other suitable device to interface with network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. Devices 1020 may be another machine or any of a wide variety of peripheral devices (e.g., a peripheral device coupled via a Universal Serial Bus (USB)).

Moreover, communication components 1040 may detect identifiers or include components operable to detect identifiers. For example, the communication components 1040 may include Radio Frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

What is claimed is:

1. A method comprising:
   receiving, by a digital content delivery system, a request from a client-side digital delivery device to rent a first digital movie;
   in response to receiving the request:
      assigning a digital content license to a user account associated with the client-side digital delivery device, the digital content license permitting a user associated with the user account to stream the first digital movie from the client-side digital content delivery device associated with the user account; and
      allocating digital credits to the user account associated with the client-side digital delivery device, the digital credits allocated to the user account being redeemable to attend a scheduled presentation of the first digital movie at an exhibitor location; and
   in response to receiving a selection of a first scheduled presentation of the first digital movie:
      assigning a digital credential to the user account, the digital credential being redeemable at a first exhibitor location to gain access to the first scheduled presentation of the first digital movie; and
      deducting a first portion of the digital credits allocated to the user account based on the selection of the first scheduled presentation of the first digital movie.

2. The method of claim 1, further comprising:
   receiving, from a computing device associated with the user account, a request to schedule an integrated service in relation to the first scheduled presentation of the first digital movie;
   identifying, based on the digital credential assigned to the user account, the first scheduled presentation of the first digital movie;
   determining, based on the first scheduled presentation of the first digital movie, a set of available integrated services available at the first exhibitor location during the first scheduled presentation of the first digital movie;
   providing, to the computing device, data identifying the set of available integrated services, the data including an amount of digital credits needed to purchase each integrated service from the set of available integrated services;
   receiving, from the computing device, a user selection of a first integrated service from the set of available integrated services;
   in response to receiving the user selection of the first integrated service:
      generating, based on data associated with the first scheduled presentation of the first digital movie, a service request to provide the first integrated service in association with the first scheduled presentation of the first digital movie, the service request generated using an Application Programming Interface (API) provided by the first integrated service; and
      deducting a second portion of the digital credits allocated to the user account based on the amount of digital credits needed to purchase the first integrated service; and
   transmitting, to a remote server that provides the first integrated service, the service request to provide the first integrated service.

3. The method of claim 2, further comprising:
receiving, from the computing device, a user selection of a second integrated service from the set of available services, the second integrated service being different than the first integrated service;
in response to receiving the user selection of the second integrated service:
generating, using an API provided by the second integrated service, a service request to provide the second integrated service in association with the first scheduled presentation of the first digital movie, wherein the API provided by the first integrated service is different than the API provided by the second integrated service; and
deducting a third portion of the digital credits allocated to the user account based on the amount of digital credits needed to purchase the second integrated service; and
transmitting, to a remote server that provides the second integrated service, the service request to provide the second integrated service in association with the first scheduled presentation of the first digital movie.

4. The method of claim 2, wherein determining the set of available integrated services comprises:
determining a geographic location of the first exhibitor location; and
identifying integrated services that are available within a predetermined distance of the geographic location of the first exhibitor location.

5. The method of claim 2, wherein determining the set of available integrated services comprises:
gathering profile data from the user account; and
identifying, based on the profile data, integrated services for which the user has an existing account.

6. The method of claim 2, wherein the first integrated service is for transportation to the first exhibitor location to attend the first scheduled presentation of the first digital movie.

7. The method of claim 6, further comprising:
determining a scheduled start time of the first scheduled presentation;
determining a departure time based on the scheduled start time of the first scheduled presentation and a distance between a current location of the computing device and the first exhibitor location, wherein the service request is transmitted based on the departure time.

8. The method of claim 6, further comprising:
determining a current geographic location of the computing device, wherein the current geographic location of the computing device is included in the service request.

9. The method of claim 2, wherein the first integrated service is generating a social networking post, the method further comprising:
gathering, from the user account, login credentials for a social networking site;
using the login credentials to access a social networking account of the social networking site;
generating the social networking post based on the first scheduled presentation of the digital movie at the exhibitor location, the social networking post indicating that the user is attending the first scheduled presentation of the digital movie; and
causing the social networking post to be published to the social networking account of the user.

10. A digital content delivery system comprising:
one or more computer processors; and
one or more computer-readable mediums storing instructions that, when executed by the one or more computer processors, cause the digital content delivery system to perform operations comprising:
receiving a request from a client-side digital delivery device to rent a first digital movie;
in response to receiving the request:
assigning a digital content license to a user account associated with the client-side digital delivery device, the digital content license permitting a user associated with the user account to stream the first digital movie from the client-side digital content delivery device associated with the user account; and
allocating digital credits to the user account associated with the client-side digital delivery device, the digital credits allocated to the user account being redeemable to attend a scheduled presentation of the first digital movie at an exhibitor location; and
in response to receiving a selection of a first scheduled presentation of the first digital movie:
assigning a digital credential to the user account, the digital credential being redeemable at a first exhibitor location to gain access to the first scheduled presentation of the first digital movie; and
deducting a first portion of the digital credits allocated to the user account based on the selection of the first scheduled presentation of the first digital movie.

11. The digital content delivery system of claim 10, the operations further comprising:
receiving, from a computing device associated with the user account, a request to schedule an integrated service in relation to the first scheduled presentation of the first digital movie;
identifying, based on the digital credential assigned to the user account, the first scheduled presentation of the first digital movie;
determining, based on the first scheduled presentation of the first digital movie, a set of available integrated services available at the first exhibitor location during the first scheduled presentation of the first digital movie;
providing, to the computing device, data identifying the set of available integrated services, the data including an amount of digital credits needed to purchase each integrated service from the set of available integrated services;
receiving, from the computing device, a user selection of a first integrated service from the set of available integrated services;
in response to receiving the user selection of the first integrated service:
generating, based on data associated with the first scheduled presentation of the first digital movie, a service request to provide the first integrated service in association with the first scheduled presentation of the first digital movie, the service request generated using an Application Programming Interface (API) provided by the first integrated service; and
deducting a second portion of the digital credits allocated to the user account based on the amount of digital credits needed to purchase the first integrated service; and
transmitting, to a remote server that provides the first integrated service, the service request to provide the first integrated service.

12. The digital content delivery system of claim 11, the operations further comprising:

receiving, from the computing device, a user selection of a second integrated service from the set of available services, the second integrated service being different than the first integrated service;

in response to receiving the user selection of the second integrated service:

generating, using an API provided by the second integrated service, a service request to provide the second integrated service in association with the first scheduled presentation of the first digital movie, wherein the API provided by the first integrated service is different than the API provided by the second integrated service; and deducting a third portion of the digital credits allocated to the user account based on the amount of digital credits needed to purchase the second integrated service; and transmitting, to a remote server that provides the second integrated service, the service request to provide the second integrated service in association with the first scheduled presentation of the first digital movie.

13. The digital content delivery system of claim 11, wherein determining the set of available integrated services comprises:

determining a geographic location of the first exhibitor location; and identifying integrated services that are available within a predetermined distance of the geographic location of the first exhibitor location.

14. The digital content delivery system of claim 11, wherein determining the set of available integrated services comprises:

gathering profile data from the user account; and identifying, based on the profile data, integrated services for which the user has an existing account.

15. The digital content delivery system of claim 11, wherein the first integrated service is for transportation to the first exhibitor location to attend the first scheduled presentation of the first digital movie.

16. The digital content delivery system of claim 15, the operations further comprising:

determining a scheduled start time of the first scheduled presentation;

determining a departure time based on the scheduled start time of the first scheduled presentation and a distance between a current location of the computing device and the first exhibitor location, wherein the service request is transmitted based on the departure time.

17. The digital content delivery system of claim 15, the operations further comprising:

determining a current geographic location of the computing device, wherein the current geographic location of the computing device is included in the service request.

18. The digital content delivery system of claim 11, wherein the first integrated service is generating a social networking post, the method further comprising:

gathering, from the user account, login credentials for a social networking site;

using the login credentials to access a social networking account of the social networking site;

generating the social networking post based on the first scheduled presentation of the digital movie at the exhibitor location, the social networking post indicating that the user is attending the first scheduled presentation of the digital movie; and causing the social networking post to be published to the social networking account of the user.

19. A non-transitory computer-readable medium storing instructions that, when executed by one or more computer processors of a digital content delivery system, cause the digital content delivery system to perform operations comprising:

receiving a request from a client-side digital delivery device to rent a first digital movie;

in response to receiving the request:

assigning a digital content license to a user account associated with the client-side digital delivery device, the digital content license permitting a user associated with the user account to stream the first digital movie from the client-side digital content delivery device associated with the user account; and allocating digital credits to the user account associated with the client-side digital delivery device, the digital credits allocated to the user account being redeemable to attend a scheduled presentation of the first digital movie at an exhibitor location; and in response to receiving a selection of a first scheduled presentation of the first digital movie:

assigning a digital credential to the user account, the digital credential being redeemable at a first exhibitor location to gain access to the first scheduled presentation of the first digital movie; and deducting a first portion of the digital credits allocated to the user account based on the selection of the first scheduled presentation of the first digital movie.

20. The non-transitory computer-readable medium of claim 19, the operations further comprising:

receiving, from a computing device associated with the user account, a request to schedule an integrated service in relation to the first scheduled presentation of the first digital movie;

identifying, based on the digital credential assigned to the user account, e first scheduled presentation of the first digital movie;

determining, based on the first scheduled presentation of the first digital movie, a set of available integrated services available at the first exhibitor location during the first scheduled presentation of the first digital movie;

providing, to the computing device, data identifying the set of available integrated services, the data including an amount of digital credits needed to purchase each integrated service from the set of available integrated services;

receiving, from the computing device, a user selection of a first integrated service from the set of available integrated services;

in response to receiving the user selection of the first integrated service:

generating, based on data associated with the first scheduled presentation of the first digital movie, a service request to provide the first integrated service in association with the first scheduled presentation of the first digital movie, the service request generated using an Application Programming Interface (API) provided by the first integrated service; and deducting a second portion of the digital credits allocated to the user account based on the amount of digital credits needed to purchase the first integrated service; and transmitting, to a remote server that provides the first integrated service, the service request to provide the first integrated service.

* * * * *